(12) United States Patent
Pocovi et al.

(10) Patent No.: US 11,991,686 B2
(45) Date of Patent: May 21, 2024

(54) CG/SPS IN CROSS-DIVISION DUPLEX

(71) Applicant: Nokia Technologies Oy, Espoo (FI)

(72) Inventors: Guillermo Pocovi, Aalborg (DK); Ping-Heng Kuo, London (GB); Klaus Ingemann Pedersen, Aalborg (DK)

(73) Assignee: Nokia Technologies Oy, Espoo (FI)

(*) Notice: Subject to any disclaimer, the term of this patent is extended or adjusted under 35 U.S.C. 154(b) by 282 days.

(21) Appl. No.: 17/375,517

(22) Filed: Jul. 14, 2021

(65) Prior Publication Data
US 2023/0014238 A1    Jan. 19, 2023

(51) Int. Cl.
*H04W 72/1263* (2023.01)
*H04L 5/14* (2006.01)
*H04W 72/0446* (2023.01)
*H04W 72/0453* (2023.01)
*H04W 72/23* (2023.01)

(52) U.S. Cl.
CPC ......... *H04W 72/1263* (2013.01); *H04L 5/14* (2013.01); *H04W 72/0446* (2013.01); *H04W 72/0453* (2013.01); *H04W 72/23* (2023.01)

(58) Field of Classification Search
CPC ............. H04W 72/1263; H04W 72/23; H04W 72/0446; H04W 72/0453; H04L 5/14
USPC ........................................................ 370/329
See application file for complete search history.

(56) References Cited

U.S. PATENT DOCUMENTS

| | | | |
|---|---|---|---|
| 2019/0059084 A1 | 2/2019 | Lee et al. | |
| 2020/0313824 A1 | 10/2020 | Barbu et al. | |
| 2023/0056799 A1* | 2/2023 | Kim | H04W 72/1268 |

FOREIGN PATENT DOCUMENTS

| | | | | |
|---|---|---|---|---|
| EP | 3 444 987 A1 | 2/2019 | | |
| EP | 3444987 A1 * | 2/2019 | ........... | H04L 5/0044 |
| EP | 3 621 382 A1 | 3/2020 | | |
| EP | 3621382 A1 * | 3/2020 | ........... | H04L 1/1607 |
| WO | WO-2020/192923 A1 | 10/2020 | | |

(Continued)

OTHER PUBLICATIONS

"Extending 5G TDD Coverage With XDD: Cross Division Duplex", Ji et al., IEEE Access, Apr. 8, 2021 (Year: 2021).*

(Continued)

*Primary Examiner* — Intekhaab A Siddiquee
(74) *Attorney, Agent, or Firm* — Harrington & Smith

(57) ABSTRACT

A user equipment may receive a configuration message comprising at least one of: a configured grant configuration, or a semi-persistent scheduling configuration, wherein configuration may be associated with a cross-division duplexing slot format, wherein the cross-division duplexing slot format may comprise at least one of: a cross-division duplexing time slot for concurrent transmission in a plurality of communication directions, or a cross-division duplexing time slot for transmission in one communication direction; receive an information indicating at least one resource of the configuration; determine whether the at least one resource is valid, based on a comparison between a corresponding cross-division duplexing slot format of the at least one resource and the cross-division duplexing slot format associated with the configuration; and perform communication with the network device on the at least one resource based, at least partially, on a determination that the at least one resource is valid.

20 Claims, 15 Drawing Sheets

(56) References Cited

FOREIGN PATENT DOCUMENTS

| WO | WO-2020/233789 A1 | 11/2020 | |
|---|---|---|---|
| WO | WO-2021/049842 A1 | 3/2021 | |
| WO | WO-2021049842 A1 * | 3/2021 | ........... H04L 5/0035 |

OTHER PUBLICATIONS

Ji, Hyoungju, et al., "Extending 5G TDD Coverage With XDD: Cross Division Duplex", IEEE Access, Digital Object Identifier 10.1109/ACCESS.2021.3068977, Mar. 26, 2021, pp. 51380-51392.

* cited by examiner

CG1:

CG2:

Valid resources for data transmission:

1200 transmit, to a user equipment, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration message further comprises an information of at least one resource , and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration

1210 perform communication with the user equipment on the at least one resource

> transmit, to a user equipment, a configuration message comprising at least two sets of transmission parameters associated with at least one of: a configured grant configuration, or a semi-persistent scheduling configuration,
>
> wherein a set of transmission parameters of the at least two sets of transmission parameters is associated with a cross-division duplexing slot format,
>
> wherein at least one set of the at least two sets of transmission parameters is to be determined, based on an associated cross-division duplexing slot format of the at least one set, for communication with the user equipment

1310

> perform communication with the user equipment on at least one resource of the at least one of the configured grant configuration or the semi-persistent scheduling configuration causing the user equipment to use the at least one determined set of the at least two sets of transmission parameters

1400 receive, from a network device, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration comprise an information of at least one of the configured grant configuration or the semi-persistent scheduling configuration

1410 determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message

1420 perform the communication with the network device on the at least one determined resource

```
receive, from a network device, a configuration message
comprising at least two sets of transmission parameters
associated with at least one of: a configured grant configuration,
or a semi-persistent scheduling configuration, wherein a set of transmission parameters of the at least two sets
of transmission parameters is associated with a cross-division
duplexing slot format
```
1510

```
determine at least one set of the at least two sets of transmission
parameters, based on an associated cross-division duplexing slot
format of the at least one set of the at least two sets of
transmission parameters for communication with the network
device
```
1520

```
perform the communication with the network device on at least
one resource of the at least one of the configured grant
configuration or the semi-persistent scheduling configuration
using the at least one determined set of the at least two sets of
transmission parameters
```
1530

FIG. 15

CG/SPS IN CROSS-DIVISION DUPLEX

BACKGROUND

Technical Field

The example and non-limiting embodiments relate generally to communications and, more particularly, to resource allocation for cross-division duplexing.

Brief Description of Prior Developments

It is known, in configuration of uplink resources, to configure a single configuration of resources.

SUMMARY

The following summary is merely intended to be illustrative. The summary is not intended to limit the scope of the claims.

In accordance with one aspect, an apparatus comprising: at least one processor; and at least one memory including computer program code; the at least one memory and the computer program code configured to, with the at least one processor, cause the apparatus at least to: transmit, to a user equipment, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration message further comprises an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and perform communication with the user equipment on the at least one resource.

In accordance with one aspect, a method comprising: transmitting, to a user equipment, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration message further comprises an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and performing communication with the user equipment on the at least one resource.

In accordance with one aspect, an apparatus comprising means for performing: transmitting, to a user equipment, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration message further comprises an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and performing communication with the user equipment on the at least one resource.

In accordance with one aspect, a non-transitory computer-readable medium comprising program instructions stored thereon which, when executed with at least one processor, cause the at least one processor to: transmit, to a user equipment, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration message further comprises an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and perform communication with the user equipment on the at least one resource.

In accordance with one aspect, an apparatus comprising: at least one processor; and at least one memory including computer program code; the at least one memory and the computer program code configured to, with the at least one processor, cause the apparatus at least to: transmit, to a user equipment, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format, wherein at least one set of the at least two sets of transmission parameters is to be determined, based on an associated cross-division duplexing slot format of the at least one set, for communication with the user equipment; and perform communication with the user equipment on at least one resource of the at least one of the configured grant configuration or the semi-persistent scheduling configuration causing the user equipment to use the at least one determined set of the at least two sets of transmission parameters.

In accordance with one aspect, a method comprising: transmitting, to a user equipment, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format, wherein at least one set of the at least two sets of transmission parameters is to be determined, based on an associated cross-division duplexing slot format of the at least one set, for communication with the user equipment; and performing communication with the user equipment on at least one resource of the at least one of the configured grant configuration or the semi-persistent scheduling configuration causing the user equipment to use the at least one determined set of the at least two sets of transmission parameters.

In accordance with one aspect, an apparatus comprising means for performing: transmitting, to a user equipment, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format, wherein at least one set of the at least two sets of transmission parameters is to be determined, based on an associated cross-division duplexing slot format of the at least one set, for communication with the user equipment; and performing communication with the user equipment on at least one resource of the at least one of the configured grant configuration or the semi-persistent scheduling configuration causing the user equipment to use the at least one determined set of the at least two sets of transmission parameters.

In accordance with one aspect, a non-transitory computer-readable medium comprising program instructions stored thereon which, when executed with at least one processor, cause the at least one processor to: transmit, to a user equipment, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format, wherein at least one set of the at least two sets of transmission parameters is to be determined, based on an associated cross-division duplexing slot format of the at least one set, for communication with the user equipment; and perform communication with the user equipment on at least one resource of the at least one of the configured grant configuration or the semi-persistent scheduling configuration causing the user equipment to use the at least one determined set of the at least two sets of transmission parameters.

In accordance with one aspect, an apparatus comprising: at least one processor; and at least one memory including computer program code; the at least one memory and the computer program code configured to, with the at least one processor, cause the apparatus at least to: receive, from a network device, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration comprises an information of at least one resource of at least one of the configured grant configuration or the semi-persistent scheduling configuration; determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and perform communication with the network device on the at least one determined resource.

In accordance with one aspect, a method comprising: receiving, from a network device, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration comprises an information of at least one resource of at least one of the configured grant configuration or the semi-persistent scheduling configuration; determining whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and performing communication with the network device on the at least one determined resource.

In accordance with one aspect, an apparatus comprising means for performing: receiving, from a network device, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration comprises an information of at least one resource of at least one of the configured grant configuration or the semi-persistent scheduling configuration; determining whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and performing communication with the network device on the at least one determined resource.

In accordance with one aspect, a non-transitory computer-readable medium comprising program instructions stored thereon which, when executed with at least one processor, cause the at least one processor to: receive, from a network device, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration comprises an information of at least one resource of at least one of the configured grant configuration or the semi-persistent scheduling configuration; determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and perform communication with the network device on the at least one determined resource.

In accordance with one aspect, an apparatus comprising: at least one processor; and at least one memory including computer program code; the at least one memory and the computer program code configured to, with the at least one processor, cause the apparatus at least to: receive, from a network device, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format; determine at least one set of the at least two sets of transmission parameters, based on an associated cross-division duplexing slot format of the at least one set of the at least two sets of transmission parameters for communication with the network device; and perform the communication with the network device on at least one resource of the at least one of the configured grant configuration or the semi-persistent scheduling configuration using the at least one determined set of the at least two sets of transmission parameters.

In accordance with one aspect, a method comprising: receiving, from a network device, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format; determining at least one set of the at least two sets of transmission parameters, based on an associated cross-division duplexing slot format of the at least one set of the at least two sets of transmission parameters for communication with the network device; and performing the communication with the network device on at least one resource of the at least one of the configured grant configuration or the semi-persistent scheduling configuration using the at least one determined set of the at least two sets of transmission parameters.

In accordance with one aspect, an apparatus comprising means for performing: receiving, from a network device, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format; determining at least one set of the at least two sets of transmission parameters, based on an associated cross-division duplexing slot format of the at least one set of the at least two sets of transmission parameters for communication with the network device; and performing the communication with the network device on at least one resource of the at least one of the configured grant configuration or the semi-persistent scheduling configuration using the at least one determined set of the at least two sets of transmission parameters.

In accordance with one aspect, a non-transitory computer-readable medium comprising program instructions stored thereon which, when executed with at least one processor, cause the at least one processor to: receive, from a network device, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format; determine at least one set of the at least two sets of transmission parameters, based on an associated cross-division duplexing slot format of the at least one set of the at least two sets of transmission parameters for communication with the network device; and perform the communication with the network device on at least one resource of the at least one of the configured grant configuration or the semi-persistent scheduling configuration using the at least one determined set of the at least two sets of transmission parameters.

BRIEF DESCRIPTION OF THE DRAWINGS

The foregoing aspects and other features are explained in the following description, taken in connection with the accompanying drawings, wherein:

FIG. 12 is a flowchart illustrating steps as described herein;

FIG. 13 is a flowchart illustrating steps as described herein;

FIG. 14 is a flowchart illustrating steps as described herein; and

FIG. 15 is a flowchart illustrating steps as described herein.

DETAILED DESCRIPTION OF EMBODIMENTS

Figure 1:
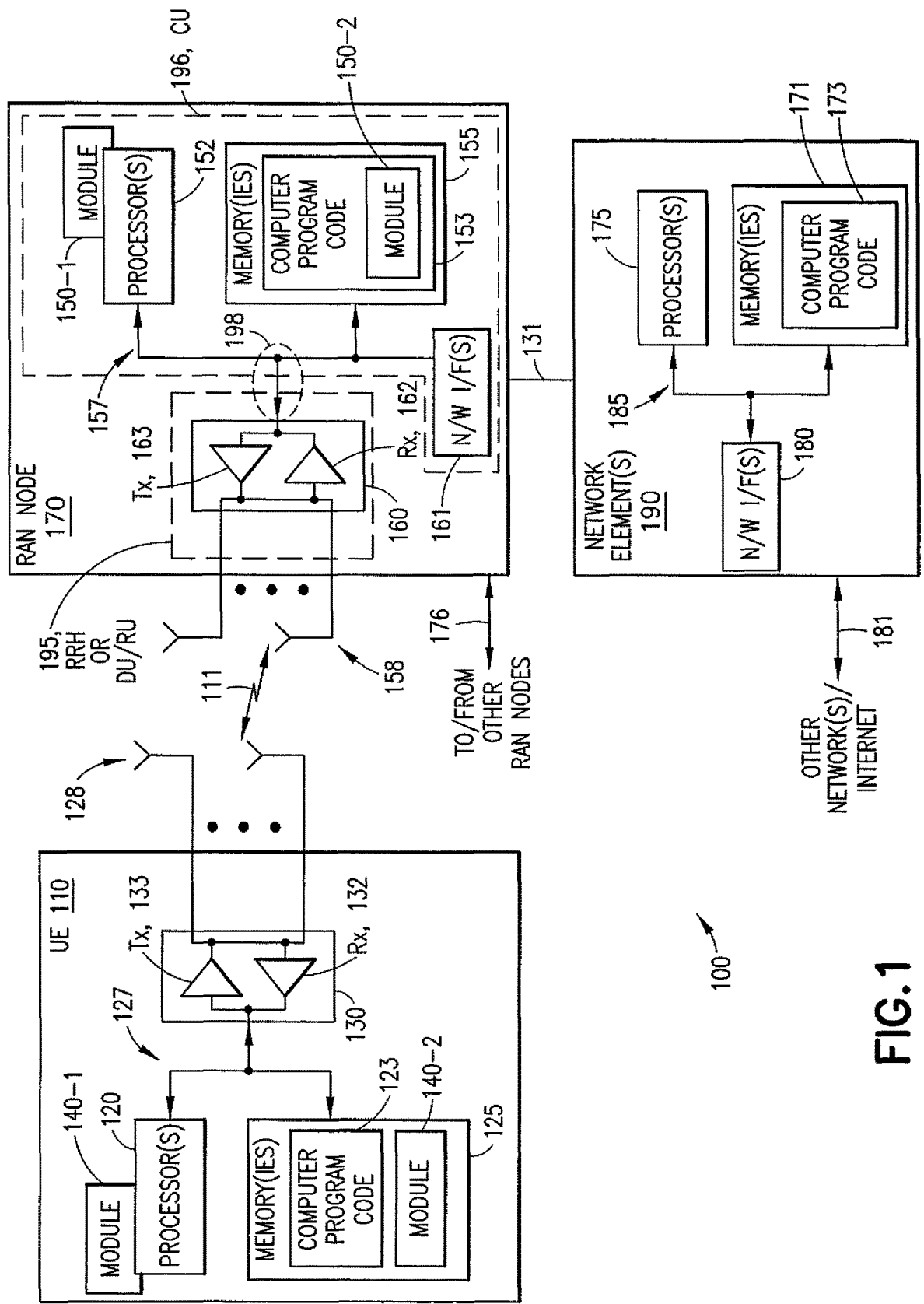
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
BWP bandwidth part
CG configured grant
CLI cross-link interference
CU central unit
DCI downlink control information
DL downlink
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FDD frequency division duplex
gNB (or gNodeB) base station for 5G/NR, i.e., a node providing NR user plane and control plane protocol terminations towards the UE, and connected via the NG interface to the 5GC I/F interface
IIOT Industrial Internet of Things
L1 layer 1
LTE long term evolution
MAC medium access control
MCS modulation and coding scheme
MME mobility management entity
OAM operations, administration and maintenance
OFDM orthogonal frequency division multiple access
ng or NG new generation
ng-eNB or NG-eNB new generation eNB
NR new radio
N/W or NW network
PDCP packet data convergence protocol
PDSCH physical downlink shared channel
PHY physical layer
PRB physical resource block
PUSCH physical uplink shared channel
RAN radio access network
RF radio frequency
RLC radio link control
RRC radio resource control
RRH remote radio head
RS reference signal
RU radio unit
Rx receiver
SDAP service data adaptation protocol
SGW serving gateway
SINR signal-to-interference plus noise ratio
SMF session management function
SPS semi-persistent scheduling
TDD time division duplex
Tx transmitter
UE user equipment (e.g., a wireless, typically mobile device)
UPF user plane function
URLLC ultra-reliable low-latency communications
XDD cross-division duplex Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

Although not illustrated in FIG. 1, the UE 110 may also communicate with other UEs via short range communication technologies, such as Bluetooth®. If wireless communication with a network is unavailable or not possible, or in addition to network communication, the UE 110 may be capable of sidelink communication with other UEs.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHI layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment 110 can include, but are not limited to, devices integrated into vehicles, infrastructure associated with vehicular travel, wearable devices used by pedestrians or other non-vehicular users of roads, user equipment unrelated to traffic users, and user equipment configured to participate in sidelink scenarios, such as public safety user equipment and/or other commercial user equipment.

Features as described herein generally relate to duplexing modes in 3GPP NR. 3GPP NR currently supports two duplexing modes: frequency division duplex (FDD) for paired bands, and time division duplex (TDD) for unpaired bands. Industrial IoT (IIoT) and URLLC (ultra-reliable low-latency communications) are some of the use cases introduced with NR which may demand very low latency (e.g. down by 0.5 ms latency) with 99.999% or higher reliability requirements. The IIoT/URLLC requirements may more readily be fulfilled for FDD deployments, due to the constant availability of bi-directional transmission options, while the requirements may be more problematic to support for unpaired TDD deployments; only having either uplink or downlink transmission per cell for traditional TDD cases may severely limit the possibility to simultaneously support multiple URLLC users that have traffic arrival at different time-instance(s).

Figure 2:
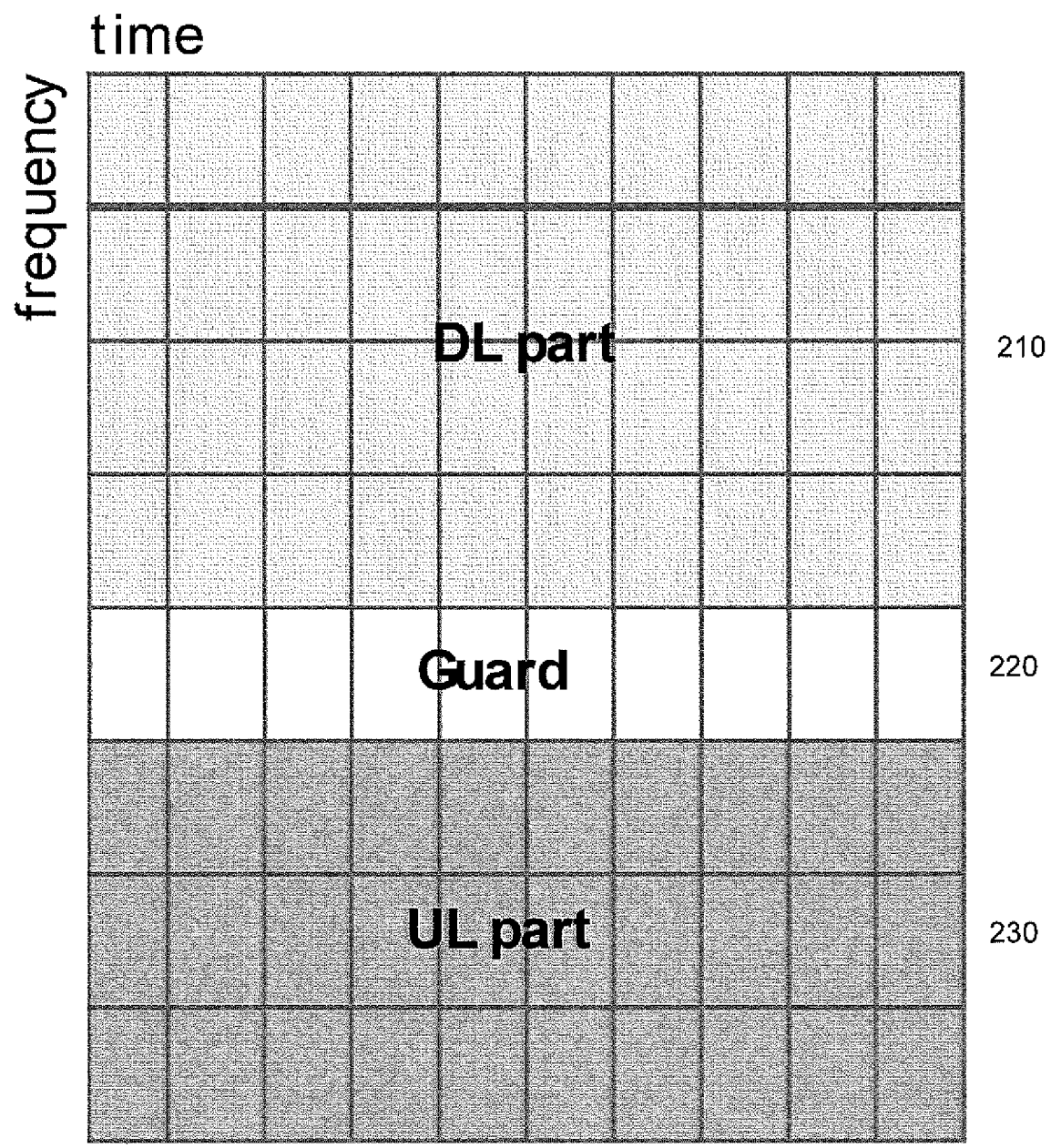
FIG. 2 is a diagram illustrating features as described herein.

Cross-division duplex (XDD), also known as flexible FDD for unpaired bands, is a new duplexing mode, for which there have been several proposals. In XDD, simultaneous downlink and uplink transmission may be allowed on different physical resource blocks (PRBs) within an unpaired wideband NR carrier with a flexible FDD configuration, as illustrated in FIG. 2, where the downlink (210) and uplink (230) transmission regions may be separated by a guard band corresponding to blanked frequency-domain resources (e.g. PRBs/subcarriers) (220). Such a flexible FDD configuration of the unpaired carrier may be relevant for future NR deployments in the 3.5 GHz band for industrial automation, where 40-200 MHz unpaired carriers may be made available. However, it may be noted that example embodiments of the present disclosure are not limited to such bands; example embodiments may be practiced with any bands.

Figure 3:
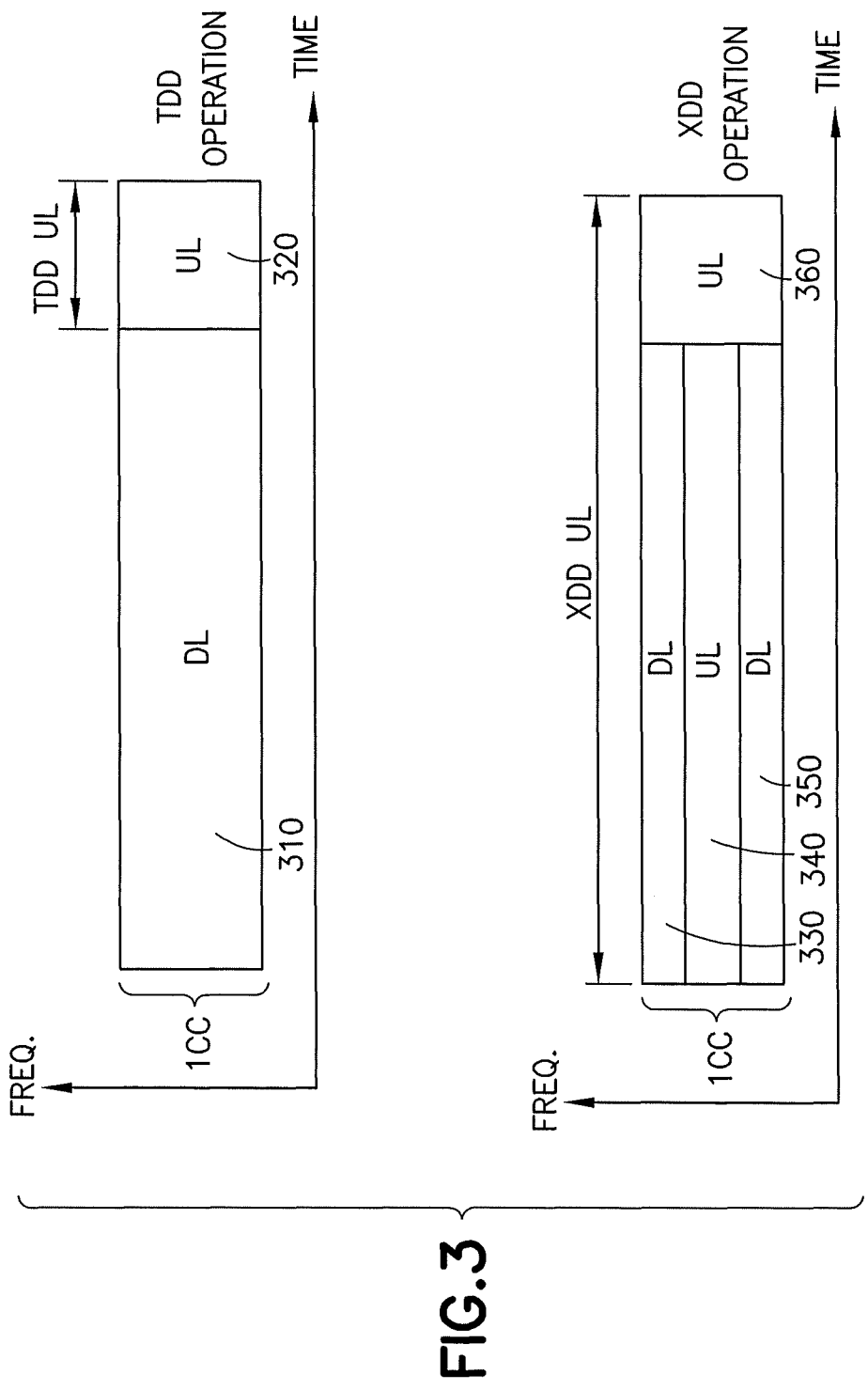
FIG. 3 is a diagram illustrating features as described herein.

A technical effect of example embodiments of the present disclosure may be to improve the UL coverage and capacity, as compared to what is achievable with traditional TDD, where DL-heavy TDD DL/UL configurations (e.g. 8:2) are often used. This is illustrated in FIG. 3, which illustrates examples of configurations of unpaired carriers. In one example, a time/frequency component 310 of the component carrier may be configured for DL communication, while another time/frequency component 320 of the component carrier may be configured for UL communication. In other words, in a configuration of the component carrier, subsequent PRBs may be configured for different transmission directions (e.g. uplink, downlink, one or both communication directions between two devices in sidelink communication, etc.), i.e. may be used for different XDD formats. In the first example of FIG. 3, TDD operation (i.e. TDD UL) may occur using UL time/frequency component 320.

A first direction of sidelink may be for transmission to another UE. A second direction of sidelink may be for reception from another UE.

In another example, XDD UL operation may be performed across the component carrier; some frequencies, during a same time period of the component carrier, may be configured for DL communication (330, 350) while other frequencies, during a same time period of the component carrier, may be configured for UL communication (340). In other words, in a configuration of the component carrier, simultaneous downlink and uplink transmission may be allowed on different PRBs within a carrier. During another time period, frequencies of the component carrier (360) may be configured for UL communication only. More specifically, with XDD there could be both slots with only one direction (uplink, downlink or sidelink) and slots with simultaneous communication in two or more directions (uplink, downlink, or sidelink).

It may be noted that Flexible FDD duplexing (XDD) may require the use of gNB self-interference cancellation, where potential leakage from different directions may cause performance degradation, for example, DL transmission on some PRBs may cause interference for UL reception on other PRBs. For example, referring to FIG. 3, DL transmissions on 330 and/or 350 may interfere with UL reception on 340, or vice versa; a gNB may need to account for this interference in order to allow for simultaneous transmission and reception.

Features as described herein may relate to semi-persistent scheduling (SPS) and/or configured grant (CG) scheduling techniques. SPS and CG techniques may be used in DL and UL, respectively, to satisfy the latency and reliability requirements of, for example, IIoT/URLLC applications. CG may be used for uplink transmission from a UE to a network. SPS may be used for downlink transmission from a gNB to a UE. SPS is especially tailored/appropriate for DL periodic/deterministic traffic, as in the case of closed-loop motion control IIoT applications. In the SPS technique, radio resources may be configured and allocated to a UE for a period of time such that control signaling may be reduced. CG is attractive for both periodic and random traffic in UL, as it allows the UE to quickly transmit data on pre-configured resources without the need to send a scheduling request and/or wait for a dynamic physical uplink shared channel (PUSCH) transmission grant from the gNB.

Per Rel. 16, a UE may be configured via RRC signaling with up to 8/12 independent SPS/CG configurations per serving cell, and up to 32 per MAC entity (i.e. across all the serving cells in a cell group). Each CG/SPS configuration may be associated with a certain ID. Each CG configuration may be of either "Type-1" or "Type-2". For Type-1, the RRC configuration may include all the necessary parameters for the PUSCH allocation, including periodicity, modulation and coding scheme (MCS), time- and frequency-domain allocation, etc. For Type-2, the RRC configuration may include, mainly, the periodicity of the PUSCH allocation, whereas remaining parameters (MCS, etc.) may be indicated in the downlink control information (DCI) (e.g. with some special fields) activating each CG configuration. The activation DCI may indicate the ID of the CG configuration that is activated. Similarly, a DCI with some special fields may also be needed to release the CG configuration.

For SPS, only "Type-2" kind of operation may be possible, where the RRC configuration may include, mainly, the periodicity of the physical downlink shared channel (PDSCH) allocation, whereas remaining parameters (MCS, etc.) may be indicated in the DCI (with some special fields) activating each SPS configuration. In case of multiple SPS/CG resources overlapping in time, for SPS, the UE may only receive the SPS PDSCH corresponding to the configuration with the lowest configuration index. For CG, it may be up to UE implementation to select a grant for UL PUSCH transmissions.

SPS and CG scheduling techniques may be of great relevance to IIoT/URLLC applications. In current specifications, SPS PDSCH allocations may be dropped if at least one symbol of the pre-configured PDSCH allocation overlaps with UL TDD symbol(s). The same principle may apply for CG, i.e. the CG PUSCH allocation may be dropped if it overlaps, at least partially, with DL TDD symbol(s).

While this may be a logical restriction for traditional TDD operation, it may be suboptimal for XDD duplexing where, although some of the PRBs may conflict with the SPS and CG allocation, there may be another set of available PRBs (e.g. at the same time instant) where the CG/SPS allocation may be valid (either PRBs of the same CG/SPS allocation, or of another CG/SPS allocation with which a UE may be configured). In the present disclosure, "validity" may relate to whether a transmission/reception resource is compatible with the configuration of a carrier. If a resource is incompatible with the configuration, as in the case where the resource overlaps with resources designated for communication in a different direction, it may be considered invalid. If a resource is compatible with the configuration, such that it may be used without causing the allocation to which the resource belongs to be dropped, it may be considered valid.

Another issue related to CG/SPS in XDD operation is related to the intra-cell self-interference. For instance, the channel quality (e.g. signal-to-interference plus noise ratio (SINR)) may be expected to be worse on PRBs closer to the guard band (see FIG. 2) as a consequence of the out-of-band emissions. Therefore, even if the UL-DL conflict described above could be avoided by proper resource configuration, there may still be the issue of varying SINR due to different XDD slot format configurations, which may call for different resource allocation(s) (e.g. different MCS) based on whether self-interference may be present or not at certain time instant.

While the NR R16 CG/SPS framework may be used to partly solve the CG/SPS allocation overlap and self-interference issues described above, this approach has some drawbacks. For example, a gNB may configure single SPS/CG configuration (e.g. CG1 (430) illustrated in FIG. 4a) for which resources are always valid (i.e. no overlap with DL (410) or UL (420) symbols for CG or SPS, respectively). One problem with this approach is that, if the gNB is serving multiple URLLC/IIoT UEs, a majority of resources may be placed in a limited region of the UL bandwidth (in the UL-only slots 430), whereas remaining UL resources might not be used (note the unused PRBs in UL region 420). Another problem with this approach is that all resources may use a relatively low MCS to deal with the self-interference in the XDD slots, which may result in reduced spectral efficiency compared to when applying low MCS in the XDD slots (e.g. 330, 340, 350) and a higher MCS in the UL-only slots (e.g. 360).

Figures 4A, 4B:
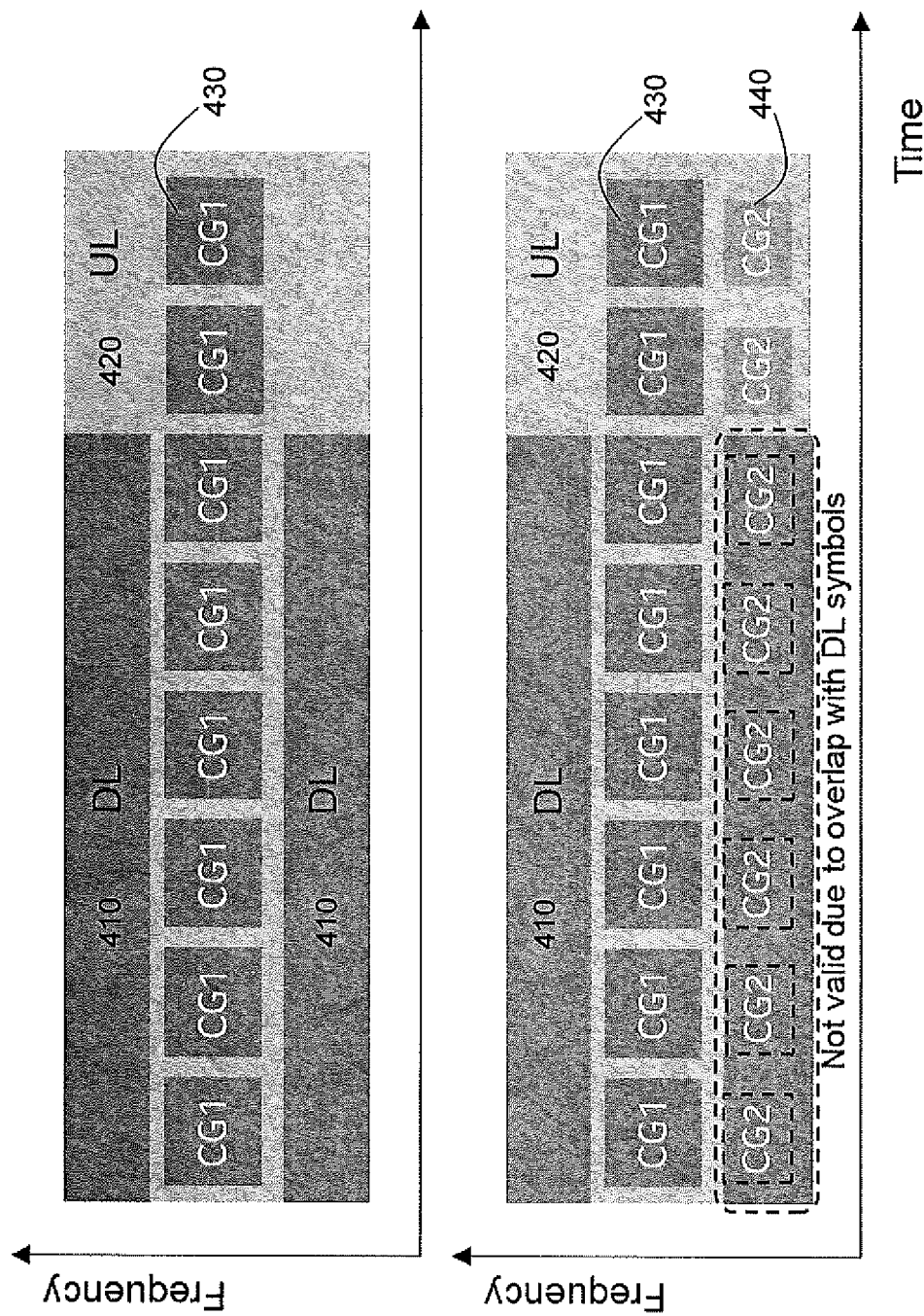
FIG. 4a is a diagram illustrating features as described herein.
FIG. 4b is a diagram illustrating features as described herein.

These problems may be solved by providing to the UE a second CG/SPS configuration, e.g. CG2 (440) as illustrated in FIG. 4b. However, specifically for CG, because the UE may have two PUSCH resources to choose from, double decoding efforts may be required at the gNB side. Also, if it is assumed that CG resources cannot be shared across UEs, there may be waste of PUSCH resources, as in the example of FIG. 4b (where two PUSCH resources may be available at the same time instance in the UL region 420, but the UE can only transmit on one of them at a time), which may result in degradation of spectral efficiency.

It may be noted that allocated CG resources may be orthogonal across UEs, i.e. PUSCH resource sharing (i.e. contention-based access) might not be implemented.

The concept of flexible FDD duplexing may include some or all of the following features. Each carrier (cells) may have static downlink and uplink transmission frequency domains, dynamic downlink and uplink frequency domains, and a guard band between the downlink and uplink resource regions. The static downlink and uplink regions may be assumed to be "static." "Static" may mean not changing over time, or, at most, configured to change on time-scales of hours, days, weeks, or months. The static downlink and uplink regions may be coordinated between neighboring cells, so there may be marginal cross-link-interference (CLI) for those resources. Coordination may happen/occur via the Xn or F1 interfaces, or from OAM. The dynamic downlink and uplink resource domains may be dynamically adjusted. The dynamic adjustments may be as fast as on slot-level, or on a slower time-scale(s) of tens of milliseconds, or even slower (e.g. on scale(s) of minutes). New network to UE signaling procedure(s) may inform UEs of flexible FDD carrier configuration, as well as facilitate synchronized carrier reconfigurations. Specific procedure(s) may support new terminal (UE) types with full-duplex and half-duplex flexible FDD capable UEs for unpaired bands.

The concept of flexible FDD duplexing may include some or all of the following features. The static downlink and uplink resource regions may be configured as the Initial-active DL BWP #0 and the Initial-active UL BWP #0 for the flexible FDD unpaired carriers. Those two initial-active BWPs may have different center frequencies, as they may be non-overlapping. The total downlink resource region (static+dynamic part) may be configured as the Default Downlink BWP. Similarly, the total uplink resource region (static+dynamic part) may be configured as the Default Uplink BWP. Although this may be for an unpaired carrier, the center frequency for those default BWPs may be different (i.e. modified as compared to Rel-15 specifications). Signaling of default BWPs may be by means of RRC signaling towards the UEs, or may be made cell-specific or by UE group signaling. Based on, for example, the offered traffic conditions, a gNB (or CU) may decide to modify the downlink and uplink frequency-domain resources split. This may be carried out by the gNB sending a new synchronized reconfiguration update message to all its RRC CONNECTED mode UEs to reconfigure the Default Downlink and Uplink BWPs.

An example embodiment may involve introduction of "XDD slot format aware" CG and SPS resource allocations where, for each CG/SPS occasion, one or another set of radio parameters (frequency domain resource allocation, MCS, a parameter related to a transmission power setting, a number of repetitions, etc.) may be used depending on the corresponding slot format (e.g. DL-only, UL-only, mixed DL-UL, one or more directions of sidelink communication, etc.) that the CG/SPS occasion is in. Two alternative methods for achieving XDD slot format aware CG/SPS resource allocations are depicted in FIGS. 5a-5b.

Figures 5A, 5B:
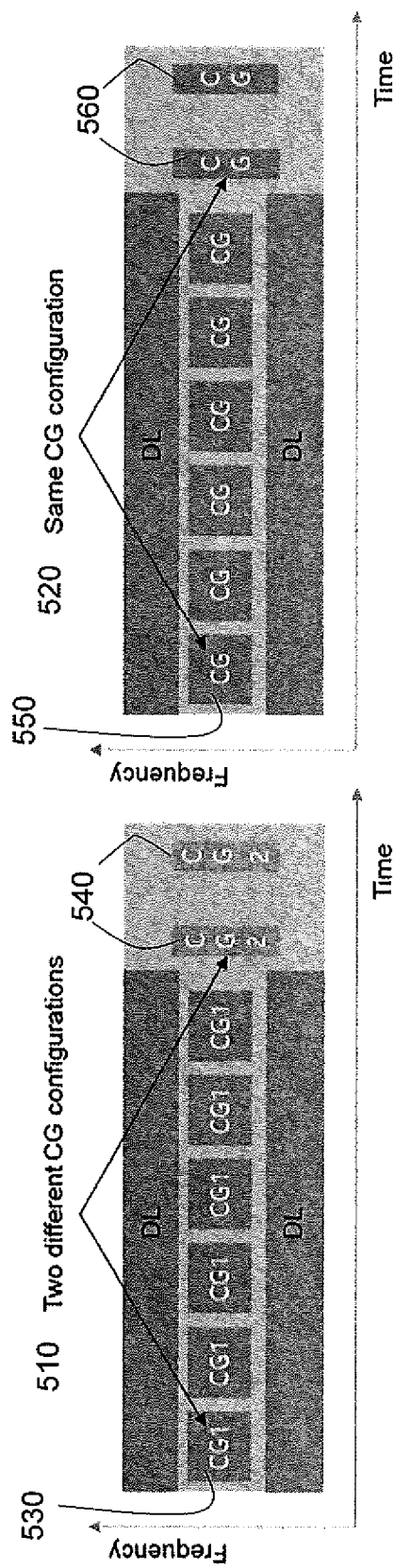
FIG. 5a is a diagram illustrating features as described herein.
FIG. 5b is a diagram illustrating features as described herein.

Referring now to FIGS. 5a-5b, illustrated are examples of implementing XDD slot format aware CG/SPS resource allocations. FIG. 5a illustrates an example of multiple CG configurations. FIG. 5b illustrates an example of a single CG configuration with different radio/transmission parameters applied.

Referring now to FIG. 5a, in an example embodiment (510) one CG/SPS configuration may be associated with one (or multiple) specific slot formats. The gNB (by implementation) may configure multiple CG/SPS configurations, each with a certain set of radio parameters and slot formats, e.g. CG configuration 1 (CG1 530) used for mixed-UL-DL slots, and CG configuration 2 (CG2 540) used for UL-only slots). In an example embodiment, the CG/SPS configurations may be "conditionally" activated and deactivated (or considered "valid" or "not valid") in accordance with/based on the slot format associated with a PUSCH/PDSCH occasion. For example, the UE may determine a slot format for a given PUSCH/PDSCH occasion, and may determine that a CG/SPS configuration associated with the determined slot format is valid, and activate that CG/SPS configuration. Another CG/SPS configuration associated with a different slot format may be determined, by the UE, to be invalid/not valid, and may not be activated/may be deactivated. In other words, only a CG/SPS configuration with a slot format that matches a determined slot format of the PUSCH/PDSCH occasion may be activated, while CG/SPS configuration with a different slot format may (remain or become) inactive. While in this example two CG configurations are illustrated, this example is not limiting; more than two CG configurations may be possible.

Referring now to FIG. 5b, in an example embodiment (520) one CG/SPS configuration may be associated/configured with two or more sets of radio parameters (frequency domain resource allocation, MCS, a parameter related to a transmission power setting, a number of repetitions, etc.). One or the other set of radio parameters may be used at a certain time instant (i.e. PUSCH/PDSCH occasion), depending on the current slot format. In the example of FIG. 5b, for a PUSCH/PDSCH occasion during a first time period (e.g. when simultaneous downlink and uplink transmission is allowed on different PRBs within a carrier) one set of radio parameters may be used (550), while for a PUSCH/PDSCH occasion during a second time period (e.g. when only uplink transmission is enabled) another set of radio parameters may be used (560). In other words, the UE may determine a slot format for a given PUSCH/PDSCH occasion, and may determine which set of radio parameters to apply to a CG/SPS configuration based on the determined slot format. While in this example two sets of radio parameters are illustrated, this example is not limiting; more than two sets of radio parameters may be possible, for example where there are more than two types of XDD slot format (e.g. UL-only, DL-only, mixed UL-DL, one direction in sidelink, two/both directions in sidelink, etc.).

In an example embodiment, a new message from gNB to UE for configuration of CG/SPS may be implemented. The new message may indicate correspondence between the CG/SPS configuration and a duplex type of slot/slot format, such that each associated CG/SPS PUSCH/PDSCH resource may be considered valid/not valid for transmission/reception depending on the slot format at the moment of the PUSCH/PDSCH occasion (as in FIG. 5a).

In an example embodiment, a new configuration message from gNB to UE for configuration of a CG/SPS may be implemented. The new configuration message may indicate at least two sets of CG/SPS radio parameters per CG/SPS configuration, as well as correspondence between each set of CG/SPS radio parameters and a duplex type of slot/slot format of the PUSCH/PDSCH occasion, such that each CG/SPS radio parameter set may be selected for application in accordance to the slot format at the moment of the PUSCH/PDSCH occasion (as in FIG. 5b).

In an example embodiment, a new UE behavior of selecting a CG/SPS configuration (FIG. 5a) and/or applying a set of CG/SPS radio parameters (FIG. 5b) for a PUSCH/PDSCH occasion, in accordance to the duplex type of the slot of the CS/SPS occasion, may be implemented.

In an example embodiment, the association between a CG/SPS configuration and a UL-DL slot format may be configured via RRC configuration/signaling, e.g. new fields in ConfiguredGrantConfig and SPS-Config.

In an example embodiment, the association between a CG/SPS configuration and a UL-DL slot format may be derived based on information provided in the activation DCI (for SPS and Type-2 CG) or implicitly based on the timing of the reception of the activation DCI and/or PDSCH/PUSCH. In other words, in case of Type-2 configured grant, where transmission parameters may be provided in the activation message (e.g. DCI in PDCCH), the UE may be able to derive the association between a slot format and a set of transmission parameters based on a timing of the DCI activating the CG or SPS configuration (e.g. reception timing of the DCI or a data transmission scheduled by DCI). Based on reception of an activation DCI, the UE may determine a slot format associated with transmission parameters included in the DCI based on the slot format used at the moment/instant at which the DCI is received, or the slot format used at the moment/instant at which a corresponding PDSCH/PUSCH transmission is received. The UE may then store this association between a slot format and a set of transmission parameters. The UE may be able to determine several associations between slot formats and sets of transmission parameters based on reception of a plurality of DCIs and/or corresponding PDSCH/PUSCH transmissions.

Different types of XDD slot formats may be configured by a gNB. A gNB may also configure the sequence of occurrence of the different symbol/slot formats in time domain. Each individual OFDM symbol may be configured by a gNB as either: DL-only (i.e. as in traditional TDD operation); UL-only (i.e. as in traditional TDD operation); sidelink (in one or both directions); or mixed DL-UL, including the ratio and/or specific position of DL and UL PRBs. It may be noted that there may be more than one possible configuration for this case, e.g. i) mixed DL-UL "type-1" with 66%:34% UL:DL ratio, and ii) mixed DL-UL "type-2" with 50%:50% UL:DL ratio. Other configurations may be possible for mixed DL-UL OFDM symbol configuration.

For the examples shown in FIGS. 5a-5b, the gNB may also provide the start and end of each DL/UL regions, e.g. DL region 1 from PRB index 1 to index X, UL region from PRB index X+1 to index X+Y, and DL region 2 from PRB index X+Y+1 to N (where N is the total number of PRBs in the carrier/BWP). The position of guard bands may be provided either explicitly, or implicitly corresponding to the PRBs not configured to be either DL or UL.

The XDD slot format configuration may be configured as an extension of existing TDD slot format configuration information elements in RRC specifications (3GPP TS 38.331): TDD-UL-DL-ConfigCommon and TDD-UL-DL-ConfigDedicated.

Figure 6A:
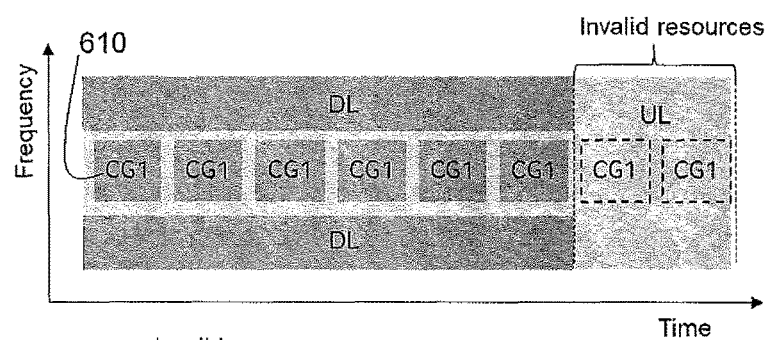
FIG. 6a is a diagram illustrating features as described herein.
Figure 6B:
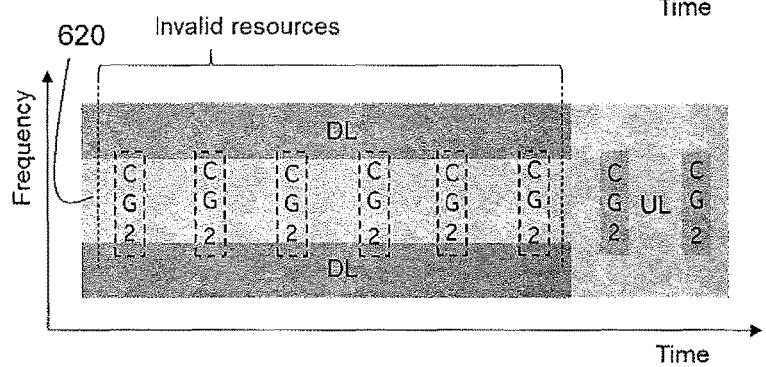
FIG. 6b is a diagram illustrating features as described herein.
Figure 6C:
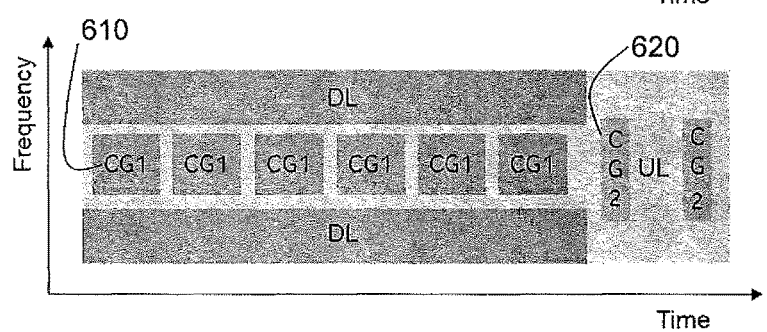
FIG. 6c is a diagram illustrating features as described herein.

In an example embodiment, a CG or SPS configuration may be associated to one or multiple slot/symbol formats. That is, the CG/SPS occasion may be deemed valid if all the symbols of the corresponding PUSCH/PDSCH allocation are of one of the associated XDD formats. Referring now to FIGS. 6a-6c, illustrated are examples of two independent CG configurations, each restricted to a specific slot format. These examples may be considered similar to the example of FIG. 5a.

In the examples of FIGS. 6a-6c, a gNB may provide the UE with two independent CG configurations, CG1 (610) and CG2 (620), each of them restricted to a specific slot format (e.g. CG1 (610) may be a valid configuration for mixed UL-DL format, while CG2 (620) may be a valid configuration for UL only format). For example, in FIG. 6a, CG1 (610) may be a valid UL configuration where the component carrier for UL is restricted to a subset of frequencies during a time period (i.e. where simultaneous downlink and uplink transmission is allowed on different PRBs within a carrier), but may be an invalid UL configuration where the component carrier for UL comprises a greater subset of frequencies during a different time period (i.e. where PRBs within a carrier are only configured to enable uplink transmission). For example, in FIG. 6b, CG2 (620) may be a valid UL configuration for mixed UL-DL slot format, but an invalid UL configuration for UL only slot format. It may be noted that different XDD configurations of the (unpaired) carrier may be possible.

The combined set of resources may allow the UE to carry the DL/UL data with the required latency and reliability. For example, in FIG. 6c, CG1 (610) may be utilized for one slot format (i.e. mixed UL-DL slot format), while CG2 (620) may be utilized for a different slot format (i.e. UL only slot format), with the result that there may be a valid CG configuration/UL resources for data transmission available for each slot format of the example component carrier.

Figure 7:
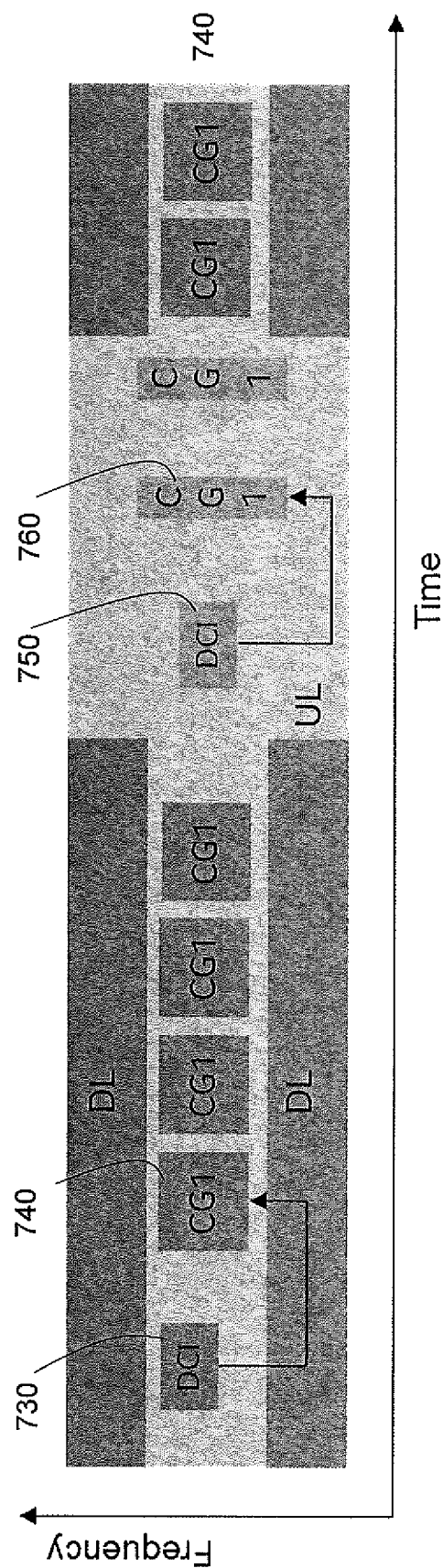
FIG. 7 is a diagram illustrating features as described herein.

In an example embodiment, a gNB may provide at least two sets of CG/SPS radio parameters for a SPS/CG configuration, as well as correspondence between each set of CG/SPS parameter(s) and a duplex type of slot/slot format. Referring now to FIG. 7, illustrated is an example of a single configured grant that may be associated with two or more different radio parameter sets, where the relation between resource allocation and slot format may be implicitly derived/determined based on the slot format at the moment of activation (i.e. PUSCH/PDSCH occasion). This example may be considered similar to the example of FIG. 5b.

For Type-1 CGs, the existing ConfiguredGrantConfig information element in RRC signaling may be extended to include two or more sets of rrc-ConfiguredUplinkGrant (each associated to a slot format) indicating the radio parameters to use for each slot format.

For Type-2 CGs or for DL SPS, the radio parameters may be provided in the activation DCI. In an example embodiment, a mix of RRC and physical layer signaling may be used to indicate the radio parameters. In an example embodiment, RRC signaling may provide/configure the UE with the new proposed behavior. For example, a 1 bit flag per configured grant configuration (i.e. in ConfiguredGrantConfig) may be used to enable an example embodiment in which one CG/SPS configuration may be associated/configured with two or more sets of radio parameters (e.g. FIGS. 5b and 7). Then, PHY layer signaling (e.g. DCI) may be used to activate and provide the resource allocation parameters for the CG configuration. The same CG configuration may be activated multiple times, and the relationship between resource allocation and XDD slot format may be implicitly derived based on the slot format at the moment of the activation. This is illustrated in FIG. 7.

Referring now to FIG. 7, a gNB may transmit a DCI (730) to a UE, which may be used to activate resource allocation parameters for CG1 (740). The gNB may also (later) transmit a DCI (750) to the UE, which may be used to activate resource allocation parameters for CG1 (760). The parameters associated with CG1 (740) may later be (re)activated. The resource allocation parameters may also be considered transmission parameters or radio parameters.

In an example embodiment, a UE may check the type of XDD slot where each CG/SPS occurs, to determine which set of CG/SPS parameters (where one CG/SPS configuration may be associated/configured with two or more sets of radio parameters) or which SPS/CG configuration (where one CG/SPS configuration may be associated to one (or multiple) specific slot formats) may be applied in order to transmit or receive data.

Figure 8:
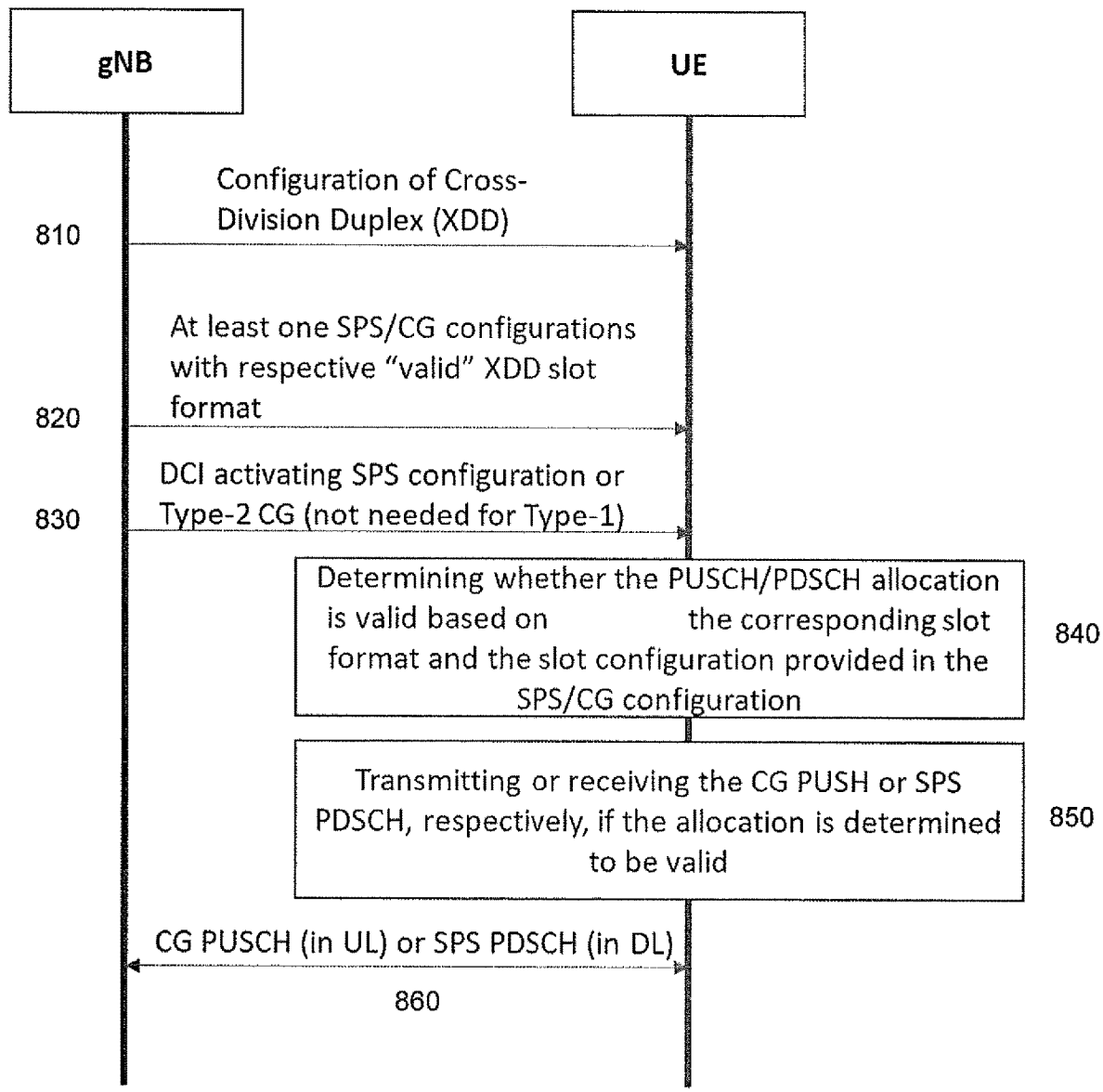
FIG. 8 is a diagram illustrating features as described herein.

Referring now to FIG. 8, illustrated is an example signaling procedure according to an example embodiment in which one CG/SPS configuration may be associated to one (or multiple) specific slot formats. The gNB may provide a CG/SPS configuration as well as its corresponding type of XDD slot (820). Then, based on the type of XDD slot that the UE is in, the corresponding CG/SPS resources may be deemed valid or invalid (840). In one example, the CG/SPS configurations may be activated if they are valid, and deactivated/not activated if they are invalid.

Referring now to FIG. 8, at 810, the gNB may transmit to the UE a configuration for XDD (e.g. one of a configuration according to FIG. 5a or FIG. 5b). In the example of FIG. 8, the configuration for XDD may be according to an example embodiment in which different CG/SPS configurations are associated with different XDD slot formats. At 820, the gNB may transmit to the UE at least one SPS/CG configuration with respective "valid" XDD slot format. At 830, the gNB may transmit to the UE a DCI activating an SPS configuration or a Type-2 CG. This DCI may be optional/not needed for Type-1 CG. At 840, the UE may determine whether the PUSCH/PDSCH allocation is valid based on the corresponding slot format and the slot configuration provided in the SPS/CG configuration. At 850, the UE may transmit the CG PUSCH or receive the SPS PDSCH if the allocation is determined to be valid. At 860, the UE may transmit the CG PUSCH (in UL) and/or the gNB may transmit the SPS PDSCH (in DL). Although not shown, a subsequent PUSCH/PDSCH resource may be deemed as "not valid" and therefore not used for transmission or reception by the UE.

Figure 9:
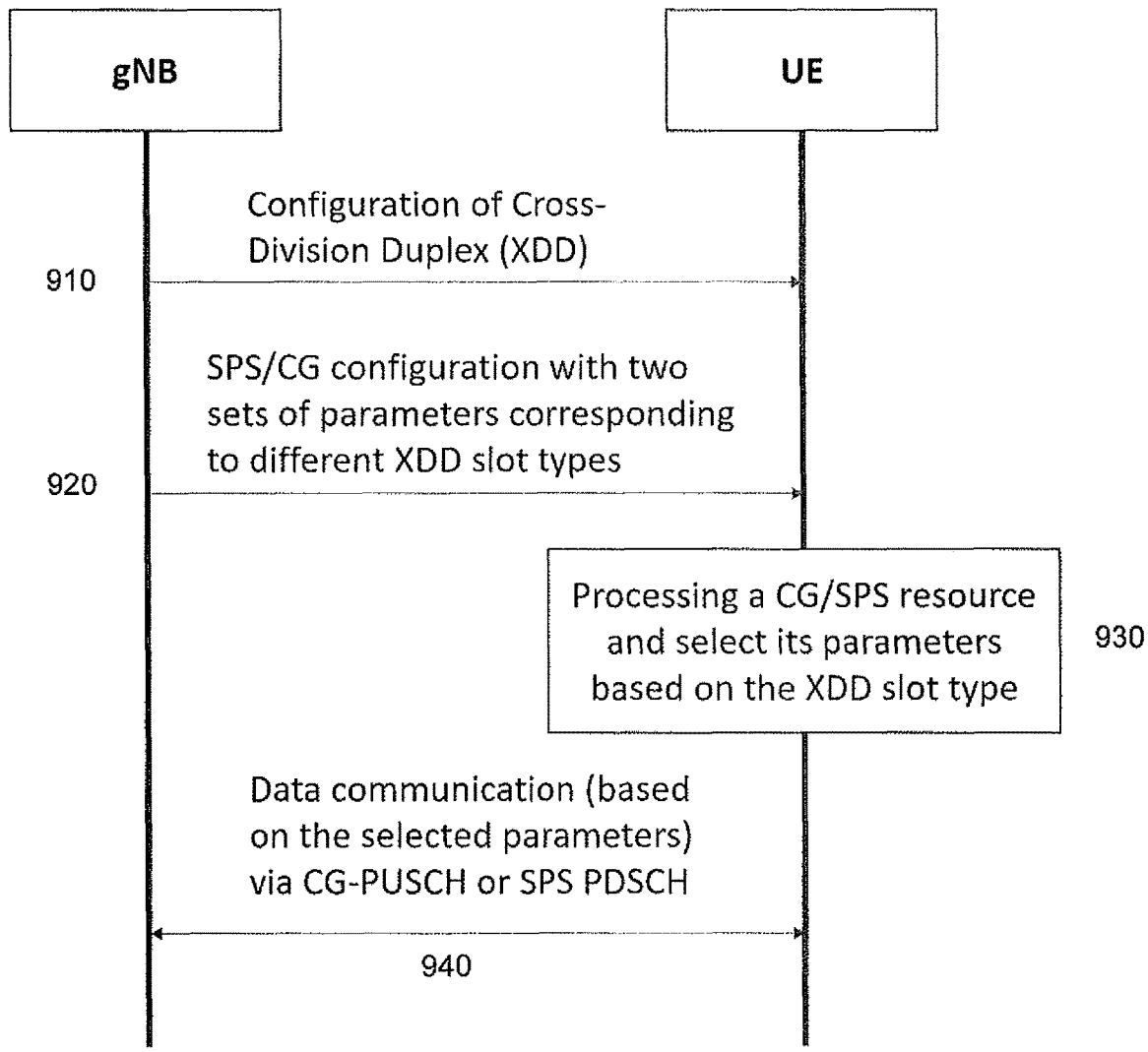
FIG. 9 is a diagram illustrating features as described herein.

Referring now to FIG. 9, illustrated is an example signaling procedure according to an example embodiment in which one CG/SPS configuration may be associated/configured with two or more sets of radio/transmission parameters. The gNB may provide two set of parameters (e.g. MCS), wherein each parameter set may correspond to a type of XDD slot (920). The parameter set may be signaled by RRC configuration or by a combination of higher-layer and physical layer signaling, as previously described. The type/format of XDD slot may be/indicate whether the slot is used for only one direction of communication (e.g. only for UL or only for DL), or is used for two directions of communication (e.g. some PRBs in the slot may be used for UL, while some PRBs in the slot may be used for DL). Then, when processing this CG/SPS, the UE may check the type of XDD slot where this CG/SPS occurs, and may accordingly determine which set of CG/SPS parameters may be applied in order to transmit or receive data (930). A third or additional type(s) of XDD slot may also be provided.

Referring now to FIG. 9, at 910, the gNB may transmit to the UE a configuration for XDD (e.g. one of a configuration according to FIG. 5a or FIG. 5b). In the example of FIG. 9, the configuration for XDD may be according to an example embodiment in which a SPS/CG configuration is associated with a plurality of sets of radio parameters. At 920, the gNB may transmit to the UE an SPS/CG configuration with two sets of parameters corresponding to different XDD slot types. At 930, the UE may process a CG/SPS resource and may select its parameters based on the XDD slot type. At 940, data communication may be performed based on the selected parameters, e.g. via CG-PUSCH or SPS PDSCH.

In an example embodiment, the cross-division duplexing slot format may be a cross-division duplexing time slot for concurrent transmission in a plurality of communication directions, or a cross-division duplexing time slot for transmission in one communication direction. For example, an uplink only slot format may be an example of a cross-division duplexing time slot for transmission in a single communication direction. For example, a mixed uplink-downlink slot format may be an example of a cross-division duplexing time slot for transmission in a plurality of communication directions.

The communication direction of a cross-division duplexing time slot may be uplink, downlink, and/or sidelink. Sidelink (SL) may provide communication between a vehicle and a network, infrastructure(s), other vehicle(s), or other road user(s) in the surrounding/immediate area. Such communication may enable proximity service (ProSe), or transmission of information about the surrounding environment, between devices in close proximity, for example device-to-device (D2D) communication technology. Such direct communication may be available even when network coverage is unavailable. Additionally or alternatively, NR SL methods may be implemented in scenarios unrelated to traffic users, such as public safety scenarios and/or commercial scenarios. Sidelink time slots may be configured to provide groupcast, unicast, multicast, and/or broadcast procedures.

Figure 10:
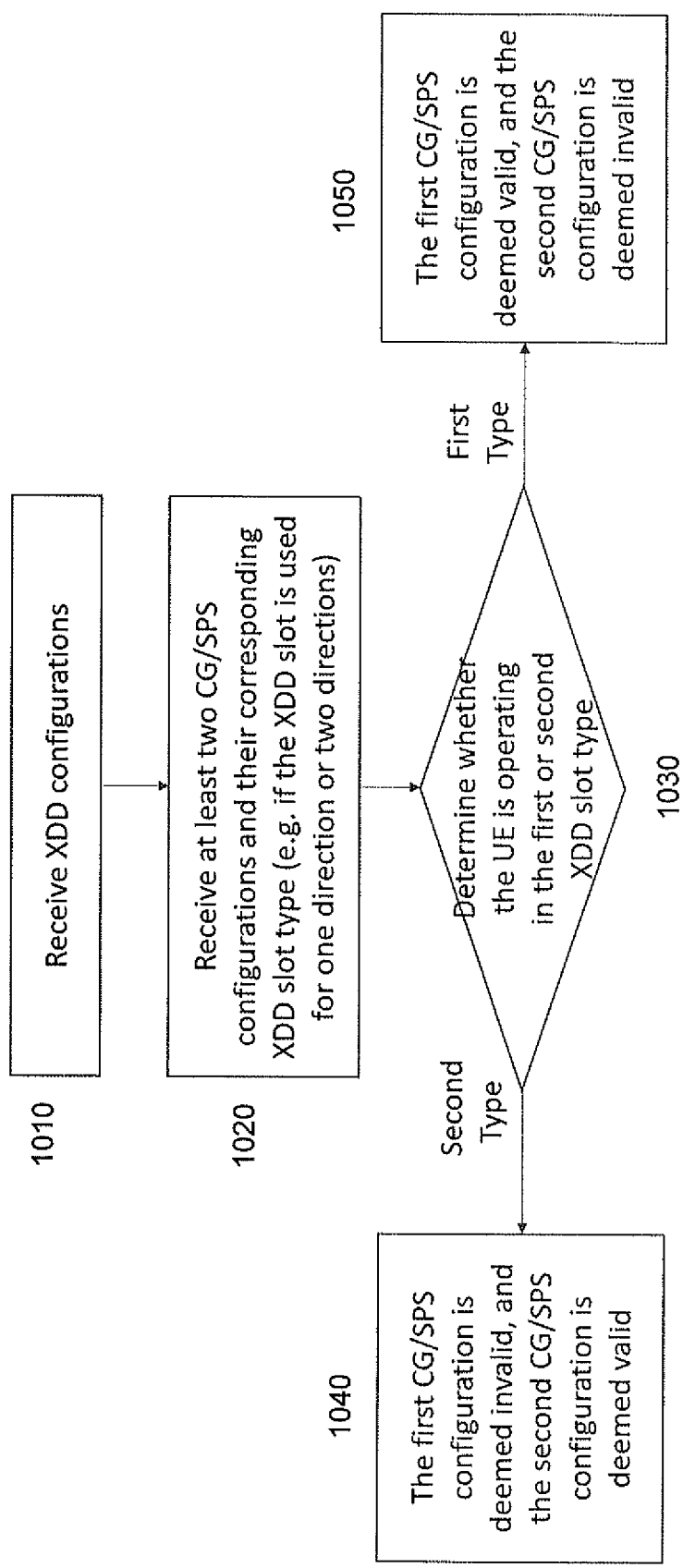
FIG. 10 is a diagram illustrating features as described herein.
Figure 11:
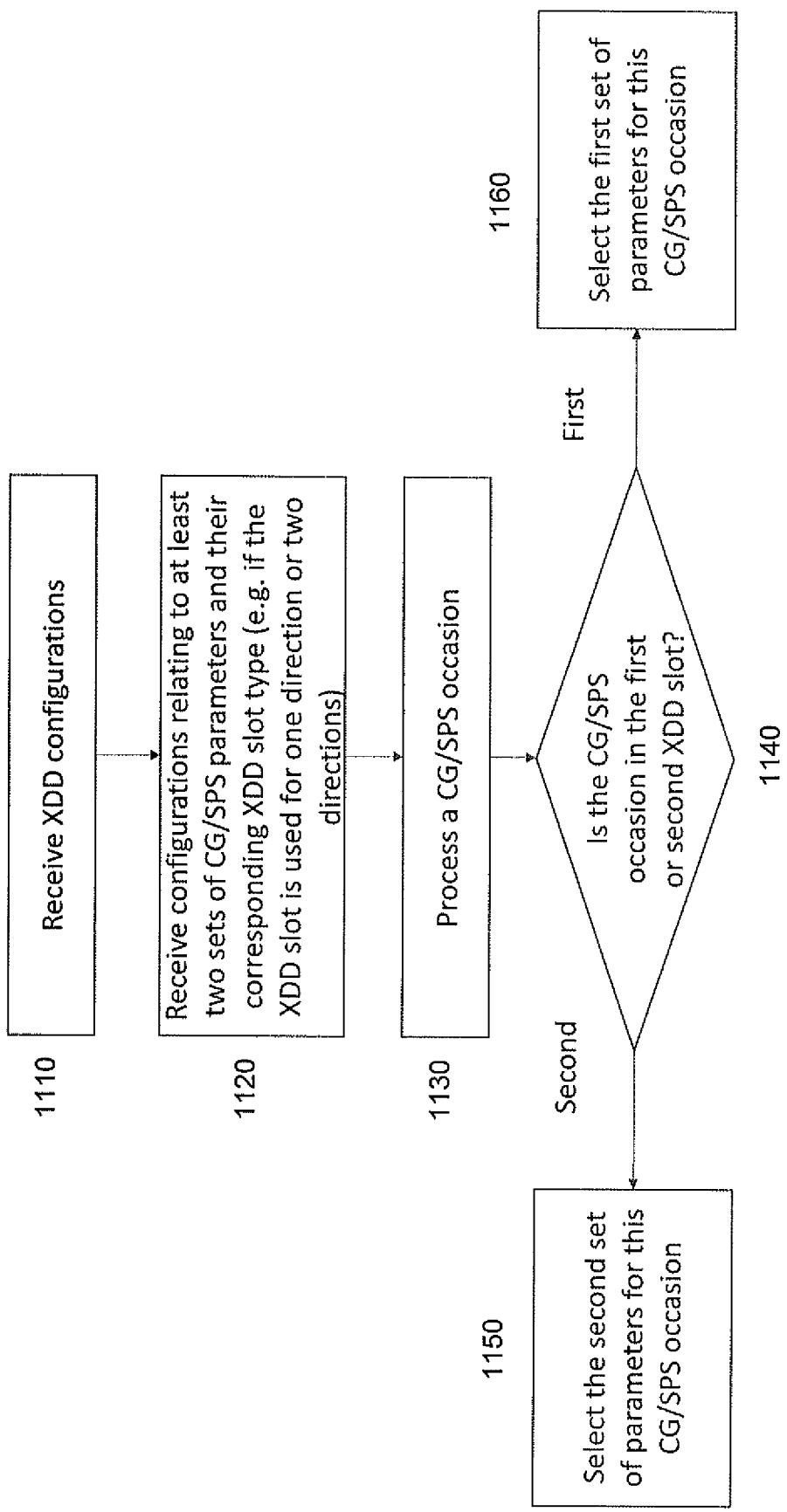
FIG. 11 is a flowchart illustrating steps as described herein.

Referring now to FIGS. 10-11, illustrated are examples of UE operation in example embodiments where one CG/SPS configuration may be associated to one (or multiple) specific slot formats (FIG. 10) and where one CG/SPS configuration may be associated/configured with two or more sets of radio parameters (FIG. 11).

For FIG. 10, it may be noted that the illustrated operation may correspond to an example embodiment in which a gNB may provide multiple SPS/CG configurations (with different slot format associations) to guarantee that the overall amount of 'valid' SPS/CG resources is sufficient to carry the DL/UL data with the required latency and reliability. At 1010, the UE may receive XDD configuration(s). At 1020, the UE may receive at least two CG/SPS configurations and their corresponding XDD slot type (e.g. if the XDD slot is used for one direction or two directions (UL+DL)). At 1030, the UE may determine whether the UE is operating in the first or second XDD slot type. If the UE is operating in the second XDD slot type, at 1040, the UE may deem/determine the first CG/SPS configuration invalid, and may deem/determine the second CG/SPS configuration is valid. Alternatively, the UE may choose a second resource based on the determination that the UE is operating in the second XDD slot type/format, with which the second resource is associated. If the UE is operating in the first XDD slot type, at 1050, the UE may deem/determine the first CG/SPS configuration is valid, and may deem/determine the second CG/SPS configuration is invalid. Alternatively, the UE may choose a first resource based on the determination that the UE is operating in the first XDD slot type, with which the first resource is associated.

Referring now to FIG. 11, at 1110 the UE may receive XDD configuration(s). At 1120, the UE may receive configurations relating to at least two sets of CG/SPS parameters and their corresponding XDD slot type (e.g. if the XDD slot is used for one direction or two directions). At 1130, the UE may process a CG/SPS occasion. At 1140, the UE may determine whether the CG/SPS occasion is in the first or second XDD slot. If the UE determines that the CG/SPS occasion is in the second XDD slot, at 1150, the UE may select the second set of parameters for this CG/SPS occasion. The second set of parameters may be associated with the format of the second XDD slot. If the UE determines that the CG/SPS occasion is in the first XDD slot, at 1160, the UE may select the first set of parameters for this CG/SPS occasion. The first set of parameters may be associated with the format of the first XDD slot.

In an example embodiment, when the CG/SPS occurs in an XDD slot, which is used for both directions, a lower MCS may be applied in a bid to provide a better protection against self-interference. In contrast, the MCS may be boosted to improve spectral efficiency if the CG/SPS is in an XDD slot used for only one direction, as self-interference is less of a concern in such cases.

In an example embodiment, a UE may determine both a resource for communication and a set of transmission parameters for communication, according to one or more embodiments of the present disclosure.

In an example embodiment, there may be multiple CG/SPS configurations, where one, some, or all of the multiple configurations may be associated with multiple sets of transmission parameters. In an example embodiment, a UE may determine both a CG/SPS configuration for communication based, at least partially, on a slot format associated with the configuration, and an associated parameter set based, at least partially, on an associated slot format. In an example embodiment, the UE may perform a combination of the steps illustrated in FIGS. 10 and 11.

FIG. 12 illustrates the potential steps of an example method 1200. The example method 1200 may include: transmitting, to a user equipment, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration message further comprises an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration, 1210; and performing communication with the user equipment on the at least one resource, 1220.

FIG. 13 illustrates the potential steps of an example method 1300. The example method 1300 may include: transmitting, to a user equipment, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format, wherein at least one set of the at least two sets of transmission parameters is to be determined, based on an associated cross-division duplexing slot format of the at least one set, for communication with the user equipment, 1310; and performing communication with the user equipment on at least one resource of the at least one of the configured grant configuration or the semi-persistent scheduling configuration causing the user equipment to use the at least one determined set of the at least two sets of transmission parameters, 1320.

FIG. 14 illustrates the potential steps of an example method 1400. The example method 1400 may include: receiving, from a network device, a configuration message comprising at least one of: a configured grant configuration, or a semi-persistent scheduling configuration, wherein the at least one of the configured grant configuration or the semi-persistent scheduling configuration is associated with a cross-division duplexing slot format, wherein the configuration comprises an information of at least one resource of at least one of the configured grant configuration or the semi-persistent scheduling configuration, 1410; determining whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message, 1420; and performing communication with the network device on the at least one determined resource, 1430. For example, if the result of the comparison is positive, the resource may be used for communication with the network device. The positive comparison result indicates the at least one resource being valid and/or compatible with the configuration indicated by the configuration message. For example, if the result of the comparison is negative, the resource may not be used if the result is negative. The negative comparison result indicates the at least one resource being invalid and/or incompatible with the configuration indicated by the configuration message.

FIG. 15 illustrates the potential steps of an example method 1500. The example method 1500 may include: receiving, from a network device, a configuration message comprising at least two sets of transmission parameters associated with at least one of: a configured grant configuration, or a semi-persistent scheduling configuration, wherein a set of transmission parameters of the at least two sets of transmission parameters is associated with a cross-division duplexing slot format, 1510; determining at least one set of the at least two sets of transmission parameters, based on an associated cross-division duplexing slot format of the at least one set of the at least two sets of transmission parameters for communication with the network device, 1520; and performing the communication with the network device on at least one resource of the at least one of the configured grant configuration or the semi-persistent scheduling configuration using the at least one determined set of the at least two sets of transmission parameters, 1530.

A technical effect of example embodiments of the present disclosure may be to solve/address the problem of failing to utilizing available PRBs when some PRBs conflict with the SPS/CG allocation by providing the gNB a simple and spectral-efficient way for scheduling SPS/CG resources across different XDD slot formats, while still reducing the amount of redundant/"wasted" CG/SPS allocations.

A technical effect of example embodiments of the present disclosure may be to solve/address the problem of intra-cell self-interference by providing the gNB a simple and spectral-efficient way for scheduling SPS/CG resources across different XDD slot formats, while still reducing the amount of redundant/"wasted" CG/SPS allocations.

A technical effect of example embodiments of the present disclosure may be to enable a common understanding, for both UE and gNB, of transmission parameters used for both UL and DL communications. A technical effect of example embodiments of the present disclosure may be to enable parallel determination of transmission parameters used for both transmission and reception in order to enable alignment of UE and gNB. In an example, a technical effect of example embodiments of the present disclosure may be, for DL semi-persistent scheduling (SPS), to enable a UE to determine transmission parameters selected by a gNB for DL transmission so that the UE may be able to decode the downlink transmission successfully.

In accordance with one example embodiment, an apparatus may comprise: at least one processor; and at least one memory including computer program code; the at least one memory and the computer program code configured to, with the at least one processor, cause the apparatus at least to perform: transmit, to a user equipment, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration message may further comprise an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and perform communication with the user equipment on the at least one resource.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least two of: uplink, downlink, a first direction of sidelink, or a second direction of sidelink.

The one communication direction may comprise communication in one of: uplink only, downlink only, a first direction of sidelink only, or a second direction of sidelink only.

The communication in the first direction of sidelink or the communication in the second direction of sidelink may comprise communication between the apparatus and the user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink downlink.

The configuration message may be transmitted via radio resource control signaling.

The configuration message may comprise a downlink control information message.

The configuration message may comprise, at least, a radio resource control configuration message and a downlink control information message configured to activate the at least one of the configured grant configuration or the semi-persistent scheduling configuration, wherein a timing of reception of one of: the downlink control information message, a data transmission scheduled with the downlink control information message may be configured to indicate the cross-division duplexing slot format associated with the at least one of the configured grant configuration or the semi-persistent scheduling configuration.

The configuration message may be configured to indicate: a first cross-division duplexing slot format associated with a first configuration of the at least one of the configured grant configuration or the semi-persistent scheduling configuration, and a second cross-division duplexing slot format associated with a second configuration of the at least one of the configured grant configuration or the semi-persistent scheduling configuration.

The example apparatus may be further configured to: at least one of: receive, from the user equipment, at least one transmission on the at least one resource; or transmit, to the user equipment, at least one transmission on the at least one resource.

In accordance with one aspect, an example method may be provided comprising: transmitting, to a user equipment, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration message may further comprise an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and performing communication with the user equipment on the at least one resource.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least two of: uplink, downlink, a first direction of sidelink, or a second direction of sidelink.

The one communication direction may comprise communication in one of: uplink only, downlink only, a first direction of sidelink only, or a second direction of sidelink only.

The communication in the first direction of sidelink or the communication in the second direction of sidelink may comprise communication between the apparatus and the user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The configuration message may be transmitted via radio resource control signaling.

The configuration message may comprise a downlink control information message.

The configuration message may comprise, at least, a radio resource control configuration message and a downlink control information message configured to activate the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration.

The configuration message may be configured to indicate: a first cross-division duplexing slot format associated with a first configuration of the at least one of the configured grant configuration or the semi-persistent scheduling configuration, and a second cross-division duplexing slot format associated with a second configuration of the at least one of the configured grant configuration or the semi-persistent scheduling configuration.

The performing of communication with the user equipment may comprise at least one of: receiving, from the user equipment, at least one transmission on the at least one resource; or transmitting, to the user equipment, at least one transmission on the at least one resource.

In accordance with one example embodiment, an apparatus may comprise: circuitry configured to perform: transmit, to a user equipment, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration message may further comprise an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and perform communication with the user equipment on the at least one resource.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration message may further comprise an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and perform communication with the user equipment on the at least one resource.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: transmitting, to a user equipment, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration message may further comprise an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and performing communication with the user equipment on the at least one resource.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least two of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and the user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The configuration message may be transmitted via radio resource control signaling.

The configuration message may comprise a downlink control information message.

The configuration message may comprise, at least, a radio resource control configuration message and a downlink control information message configured to activate the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration.

The configuration message may be configured to indicate: a first cross-division duplexing slot format associated with a first configuration of the at least one of the configured grant configuration or the semi-persistent scheduling configuration, and a second cross-division duplexing slot format associated with a second configuration of the at least one of the configured grant configuration or the semi-persistent scheduling configuration.

The means configured to perform communication with the user equipment may comprise means configured to perform at least one of: receiving, from the user equipment, at least one transmission on the at least one resource; or transmitting, to the user equipment, at least one transmission on the at least one resource.

In accordance with one example embodiment, a non-transitory computer-readable medium comprising program instructions stored thereon which, when executed with at least one processor, cause the at least one processor to: transmit, to a user equipment, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration message may further comprises an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and perform communication with the user equipment on the at least one resource.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and the user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The configuration message may be transmitted via radio resource control signaling.

The configuration message may comprise a downlink control information message.

The configuration message may comprise, at least, a radio resource control configuration message and a downlink control information message configured to activate the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration.

The configuration message may be configured to indicate: a first cross-division duplexing slot format associated with a first configuration of the at least one of the configured grant configuration or the semi-persistent scheduling configuration, and a second cross-division duplexing slot format associated with a second configuration of the at least one of the configured grant configuration or the semi-persistent scheduling configuration.

The example non-transitory computer-readable medium may be further configured to: to at least one of: receive, from the user equipment, at least one transmission on the at least one resource; or transmit, to the user equipment, at least one transmission on the at least one resource.

In accordance with another example embodiment, a non-transitory program storage device readable by a machine may be provided, tangibly embodying a program of instructions executable by the machine for performing operations, the operations comprising: transmit, to a user equipment, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration message may further comprises an information of at least one resource, and the at least one resource is to be determined whether or not to be used for communication based on a corresponding cross-division duplexing slot format of the at least one resource compared to the cross-division duplexing slot format associated with the at least one of the configured grant configuration or the semi-persistent scheduling configuration; and perform communication with the user equipment on the at least one resource.

In accordance with one example embodiment, an apparatus may comprise: at least one processor; and at least one memory including computer program code; the at least one memory and the computer program code configured to, with the at least one processor, cause the apparatus at least to perform: transmit, to a user equipment, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format, wherein at least one set of the at least two sets of transmission parameters is to be determined, based on an associated cross-division duplexing slot format of the at least one set, for communication with the user equipment; and perform communication with the user equipment on at least one resource of the at least one of the configured grant configuration or the semi-persistent scheduling configuration causing the user equipment to use the at least one determined set of the at least two sets of transmission parameters.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and the user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The configuration message may be transmitted via radio resource control signaling.

The configuration message may comprise a downlink control information message.

The configuration message may comprise, at least, a radio resource control configuration message and a downlink control information message, wherein the downlink control information message may include a set of transmission parameters for the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration and the set of transmission parameters associated with the cross-division duplexing slot format.

The configuration message may be configured to indicate: a first cross-division duplexing slot format associated with a first set of transmission parameters of the at least two sets of transmission parameters, and a second cross-division duplexing slot format associated with a second set of transmission parameters of the at least two sets of transmission parameters.

The set of transmission parameters associated with the cross-division duplexing slot format may comprise at least one of: a frequency domain resource allocation, a modulation and coding scheme, a periodicity, at least one parameter relating to a transmission power setting, a number of repetitions, or a time domain resource allocation.

The example apparatus may be further configured to: at least one of: receive, from the user equipment, at least one transmission on the at least one resource using the at least one determined set of the at least two sets of transmission parameters; or transmit, to the user equipment, at least one transmission on the at least one resource using the at least one determined set of the at least two sets of transmission parameters.

In accordance with one aspect, an example method may be provided comprising: transmitting, to a user equipment, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format, wherein at least one set of the at least two sets of transmission parameters is to be determined, based on an associated cross-division duplexing slot format of the at least one set, for communication with the user equipment; and performing communication with the user equipment on at least one resource of the at least one of the configured grant configuration or the semi-persistent scheduling configuration causing the user equipment to use the at least one determined set of the at least two sets of transmission parameters.

The cross-division duplexing slot format may comprise at least one of: a cross-division duplexing time slot for communication in a plurality of communication directions, or a cross-division duplexing time slot for communication in one communication direction.

The plurality the one communication direction may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and the user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The configuration message may be transmitted via radio resource control signaling.

The configuration message may comprise a downlink control information message.

The configuration message may comprise, at least, a radio resource control configuration message and a downlink control information message, wherein the downlink control information message may include a set of transmission parameters for the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration and the set of transmission parameters associated with the cross-division duplexing slot format.

The configuration message may be configured to indicate: a first cross-division duplexing slot format associated with a first set of transmission parameters of the at least two sets of transmission parameters, and a second cross-division duplexing slot format associated with a second set of transmission parameters of the at least two sets of transmission parameters.

The set of transmission parameters associated with the cross-division duplexing slot format may comprise at least one of: a frequency domain resource allocation, a modulation and coding scheme, a periodicity, at least one parameter relating to a transmission power setting, a number of repetitions, or a time domain resource allocation.

Performing communication with the user equipment may comprise at least one of: receiving, from the user equipment, at least one transmission on the at least one resource using the at least one determined set of the at least two sets of transmission parameters; or transmitting, to the user equipment, at least one transmission on the at least one resource using the at least one determined set of the at least two sets of transmission parameters.

In accordance with one example embodiment, an apparatus may comprise: circuitry configured to perform: transmit, to a user equipment, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format, wherein at least one set of the at least two sets of transmission parameters is to be determined, based on an associated cross-division duplexing slot format of the at least one set, for communication with the user equipment; and perform communication with the user equipment on at least one resource of the at least one of the configured grant configuration or the semi-persistent scheduling configuration causing the user equipment to use the at least one determined set of the at least two sets of transmission parameters.

In accordance with one example embodiment, an apparatus may comprise: processing circuitry; memory circuitry including computer program code, the memory circuitry and the computer program code configured to, with the processing circuitry, enable the apparatus to: transmit, to a user equipment, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format, wherein at least one set of the at least two sets of transmission parameters is to be determined, based on an associated cross-division duplexing slot format of the at least one set, for communication with the user equipment; and perform communication with the user equipment on at least one resource of the at least one of the configured grant configuration or the semi-persistent scheduling configuration causing the user equipment to use the at least one determined set of the at least two sets of transmission parameters.

In accordance with one example embodiment, an apparatus may comprise means for performing: transmitting, to a user equipment, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format, wherein at least one set of the at least two sets of transmission parameters is to be determined, based on an associated cross-division duplexing slot format of the at least one set, for communication with the user equipment; and performing communication with the user equipment on at least one resource of the at least one of the configured grant configuration or the semi-persistent scheduling configuration causing the user equipment to use the at least one determined set of the at least two sets of transmission parameters.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least one of: uplink, downlink, a first direction of sidelink, or a second direction of sidelink.

The one communication direction may comprise communication in at least one of: uplink only, downlink only.

The communication in the first direction of sidelink or the communication in the second direction of sidelink may comprise communication between the apparatus and the user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The configuration message may be transmitted via radio resource control signaling.

The configuration message may comprise a downlink control information message.

The configuration message may comprise, at least, a radio resource control configuration message and a downlink control information message, wherein the downlink control information message may include a set of transmission parameters for the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration and the set of transmission parameters associated with the cross-division duplexing slot format.

The configuration message may be configured to indicate: a first cross-division duplexing slot format associated with a first set of transmission parameters of the at least two sets of transmission parameters, and a second cross-division duplexing slot format associated with a second set of transmission parameters of the at least two sets of transmission parameters.

The set of transmission parameters associated with the cross-division duplexing slot format may comprise at least one of: a frequency domain resource allocation, a modulation and coding scheme, a periodicity, at least one parameter relating to a transmission power setting, a number of repetitions, or a time domain resource allocation.

The means configured to perform communication with the user equipment may comprise means configured to perform at least one of: receiving, from the user equipment, at least one transmission on the at least one resource using the at least one determined set of the at least two sets of transmission parameters; or transmitting, to the user equipment, at least one transmission on the at least one resource using the at least one determined set of the at least two sets of transmission parameters.

In accordance with one example embodiment, a non-transitory computer-readable medium comprising program instructions stored thereon which, when executed with at least one processor, cause the at least one processor to: transmit, to a user equipment, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format, wherein at least one set of the at least two sets of transmission parameters is to be determined, based on an associated cross-division duplexing slot format of the at least one set, for communication with the user equipment; and perform communication with the user equipment on at least one resource of the at least one of the configured grant configuration or the semi-persistent scheduling configuration causing the user equipment to use the at least one determined set of the at least two sets of transmission parameters.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and the user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The configuration message may be transmitted via radio resource control signaling.

The configuration message may comprise a downlink control information message.

The configuration message may comprise, at least, a radio resource control configuration message and a downlink control information message, wherein the downlink control information message may include a set of transmission parameters for the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration and the set of transmission parameters associated with the cross-division duplexing slot format.

The configuration message may be configured to indicate: a first cross-division duplexing slot format associated with a first set of transmission parameters of the at least two sets of transmission parameters, and a second cross-division duplexing slot format associated with a second set of transmission parameters of the at least two sets of transmission parameters.

The set of transmission parameters associated with the cross-division duplexing slot format may comprise at least one of: a frequency domain resource allocation, a modulation and coding scheme, a periodicity, at least one parameter relating to a transmission power setting, a number of repetitions, or a time domain resource allocation.

The example non-transitory computer-readable medium may be further configured to: at least one of: receive, from the user equipment, at least one transmission on the at least one resource using the at least one determined set of the at least two sets of transmission parameters; or transmit, to the user equipment, at least one transmission on the at least one resource using the at least one determined set of the at least two sets of transmission parameters.

In accordance with another example embodiment, a non-transitory program storage device readable by a machine may be provided, tangibly embodying a program of instructions executable by the machine for performing operations, the operations comprising: transmit, to a user equipment, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format, wherein at least one set of the at least two sets of transmission parameters is to be determined, based on an associated cross-division duplexing slot format of the at least one set, for communication with the user equipment; and perform communication with the user equipment on at least one resource of the at least one of the configured grant configuration or the semi-persistent scheduling configuration causing the user equipment to use the at least one determined set of the at least two sets of transmission parameters.

In accordance with one example embodiment, an apparatus may comprise: at least one processor; and at least one memory including computer program code; the at least one memory and the computer program code configured to, with the at least one processor, cause the apparatus at least to perform: receive, from a network device, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration may comprise an information of at least one resource of at least one of the configured grant configuration or the semi-persistent scheduling configuration; determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and perform the communication with the network device on the at least one determined resource.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and at least one other user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The received configuration message may be received via radio resource control signaling.

The received configuration message may comprise a downlink control information message.

The configuration message may comprise, at least, a radio resource control configuration message and a downlink control information message configured to activate the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration.

The configuration message may be configured to indicate: a first cross-division duplexing slot format associated with a first configuration of the at least one of the configured grant configuration or the semi-persistent scheduling configuration, and a second cross-division duplexing slot format associated with a second configuration of the at least one of the configured grant configuration or the semi-persistent scheduling configuration.

The example apparatus may be further configured to: at least one of: receive, from the network device, at least one transmission on the at least one resource; or transmit, to the network device, at least one transmission on the at least one resource.

In accordance with one aspect, an example method may be provided comprising: receiving, from a network device, a configuration message comprising at least one of: a configured grant configuration, or a semi-persistent scheduling configuration, wherein the at least one of the configured grant configuration or the semi-persistent scheduling configuration may be associated with a cross-division duplexing slot format wherein the configuration may comprise an information of at least one resource of at least one of the configured grant configuration or the semi-persistent scheduling configuration; determining whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and performing the communication with the network device on the at least one determined resource.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between a user equipment and the network device.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The received configuration message may be received via radio resource control signaling.

The received configuration message may comprise a downlink control information message.

The configuration message may comprise, at least, a radio resource control configuration message and a downlink control information message configured to activate the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration.

The configuration message may be configured to indicate: a first cross-division duplexing slot format associated with a first configuration of the at least one of the configured grant configuration or the semi-persistent scheduling configuration, and a second cross-division duplexing slot format associated with a second configuration of the at least one of the configured grant configuration or the semi-persistent scheduling configuration.

The performing of communication with the network device may comprise at least one of: receiving, from the network device, at least one transmission on the at least one resource; or transmitting, to the network device, at least one transmission on the at least one resource.

In accordance with one example embodiment, an apparatus may comprise: circuitry configured to perform: receive, from a network device, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration may comprise an information of at least one resource of at least one of the configured grant configuration or the semi-persistent scheduling configuration; determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and perform the communication with the network device on the at least one determined resource.

In accordance with one example embodiment, an apparatus may comprise: processing circuitry; memory circuitry including computer program code, the memory circuitry and the computer program code configured to, with the processing circuitry, enable the apparatus to: receive, from a network device, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration may comprise an information of at least one resource of at least one of the configured grant configuration or the semi-persistent scheduling configuration; determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and perform the communication with the network device on the at least one determined resource.

In accordance with one example embodiment, an apparatus may comprise means for performing: receiving, from a network device, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration may comprise an information of at least one resource of at least one of the configured grant configuration or the semi-persistent scheduling configuration; determining whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and performing the communication with the network device on the at least one determined resource.

The cross-division duplexing slot format may comprise at least one of: a cross-division duplexing time slot for communication in a plurality of communication directions, or a cross-division duplexing time slot for communication in one communication direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and at least one other user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The received configuration message may be received via radio resource control signaling.

The received configuration message may comprise a downlink control information message.

The configuration message may comprise, at least, a radio resource control configuration message and a downlink control information message configured to activate the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration.

The configuration message may be configured to indicate: a first cross-division duplexing slot format associated with a first configuration of the at least one of the configured grant configuration or the semi-persistent scheduling configuration, and a second cross-division duplexing slot format associated with a second configuration of the at least one of the configured grant configuration or the semi-persistent scheduling configuration.

The means configured to perform communicating with the network device may comprise means configured to perform at least one of: receiving, from the network device, at least one transmission on the at least one resource; or transmitting, to the network device, at least one transmission on the at least one resource.

In accordance with one example embodiment, a non-transitory computer-readable medium comprising program instructions stored thereon which, when executed with at least one processor, cause the at least one processor to: receive, from a network device, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration may comprise an information of at least one resource of at least one of the configured grant configuration or the semi-persistent scheduling configuration; determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and perform the communication with the network device on the at least one determined resource.

The cross-division duplexing slot format may comprise at least one of: a cross-division duplexing time slot for communication in a plurality of communication directions, or a cross-division duplexing time slot for communication in one communication direction.

The plurality of communication directions or the one communication direction may comprises at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between a user equipment and the network device.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The received configuration message may be received via radio resource control signaling.

The received configuration message may comprise a downlink control information message.

The configuration message may comprise, at least, a radio resource control configuration message and a downlink control information message configured to activate the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration.

The configuration message may be configured to indicate: a first cross-division duplexing slot format associated with a first configuration of the at least one of the configured grant configuration or the semi-persistent scheduling configuration, and a second cross-division duplexing slot format associated with a second configuration of the at least one of the configured grant configuration or the semi-persistent scheduling configuration.

The example non-transitory computer-readable medium may be further configured to: at least one of: receive, from the network device, at least one transmission on the at least one resource; or transmit, to the network device, at least one transmission on the at least one resource.

In accordance with another example embodiment, a non-transitory program storage device readable by a machine may be provided, tangibly embodying a program of instructions executable by the machine for performing operations, the operations comprising: receive, from a network device, a configuration message comprising at least one of: a configured grant configuration, or a semi-persistent scheduling configuration, wherein the at least one of the configured grant configuration or the semi-persistent scheduling configuration may be associated with a cross-division duplexing slot format, wherein the configuration may comprise an information of at least one resource of at least one of the configured grant configuration or the semi-persistent scheduling configuration; determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and perform the communication with the network device on the at least one determined resource.

In accordance with one example embodiment, an apparatus may comprise: at least one processor; and at least one memory including computer program code; the at least one memory and the computer program code configured to, with the at least one processor, cause the apparatus at least to perform: receive, from a network device, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format; determine at least one set of the at least two sets of transmission parameters, based on an associated cross-division duplexing slot format of the at least one set of the at least two sets of transmission parameters for communication with the network device; and perform the communication with the network device on at least one resource of the at least one of the configured grant configuration or the semi-persistent scheduling configuration using the at least one determined set of the at least two sets of transmission parameters.

The cross-division duplexing slot format may comprise at least one of: a cross-division duplexing time slot for communication in a plurality of directions, or a cross-division duplexing time slot for communication in one direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and at least one other user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The received configuration message may be received via radio resource control signaling.

The received configuration message may comprise a downlink control information message.

The configuration message may comprise, at least, a radio resource control configuration message and a downlink control information message, wherein the downlink control information message may include a set of transmission parameters for the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration and the at least one determined set of transmission parameters.

The configuration message may be configured to indicate: a first cross-division duplexing slot format associated with a first set of transmission parameters of the at least two sets of transmission parameters, and a second cross-division duplexing slot format associated with a second set of transmission parameters of the at least two sets of transmission parameters.

The set of transmission parameters associated with the cross-division duplexing slot format may comprise at least one of: a frequency domain resource allocation, a modulation and coding scheme, a periodicity, at least one parameter relating to a transmission power setting, a number of repetitions, or a time domain resource allocation.

The example apparatus may be further configured to: at least one of: receive, from the network device, at least one transmission on the at least one resource using the at least one determined set of the at least two sets of transmission parameters; or transmit, to the network device, at least one transmission on the at least one resource using the at least one determined set of the at least two sets of transmission parameters.

In accordance with one aspect, an example method may be provided comprising: receiving, from a network device, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format; determining at least one set of the at least two sets of transmission parameters, based on an associated cross-division duplexing slot format of the at least one set of the at least two sets of transmission parameters for communication with the network device; and performing the communication with the network device on at least one resource of the at least one of the configured grant configuration or the semi-persistent scheduling configuration using the at least one determined set of the at least two sets of transmission parameters.

The cross-division duplexing slot format may comprise at least one of: a cross-division duplexing time slot for communication in a plurality of directions, or a cross-division duplexing time slot for communication in one direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between a user equipment and the network device.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink, or the second direction of sidelink.

The received configuration message may be received via radio resource control signaling.

The received configuration message may comprise a downlink control information message.

The configuration message may comprise, at least, a radio resource control configuration message and a downlink control information message, wherein the downlink control information message may include a set of transmission parameters for the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the set of transmission parameters associated with the at least one of the configured grant configuration or the semi-persistent scheduling configuration and the at least one determined set of transmission parameters.

The configuration message may be configured to indicate: a first cross-division duplexing slot format associated with a first set of transmission parameters of the at least two sets of transmission parameters, and a second cross-division duplexing slot format associated with a second set of transmission parameters of the at least two sets of transmission parameters.

The set of transmission parameters associated with the cross-division duplexing slot format may comprise at least one of: a frequency domain resource allocation, a modulation and coding scheme, a periodicity, at least one parameter relating to a transmission power setting, a number of repetitions, or a time domain resource allocation.

The performing of communication with the network device may comprise at least one of: receiving, from the network device, at least one transmission on the at least one resource using the at least one determined set of the at least two sets of transmission parameters; or transmitting, to the network device, at least one transmission on the at least one resource using the at least one determined set of the at least two sets of transmission parameters.

In accordance with one example embodiment, an apparatus may comprise: circuitry configured to perform: receive, from a network device, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format; determine at least one set of the at least two sets of transmission parameters, based on an associated cross-division duplexing slot format of the at least one set of the at least two sets of transmission parameters for communication with the network device; and perform the communication with the network device on at least one resource of the at least one of the configured grant configuration or the semi-persistent scheduling configuration using the at least one determined set of the at least two sets of transmission parameters.

In accordance with one example embodiment, an apparatus may comprise: processing circuitry; memory circuitry including computer program code, the memory circuitry and the computer program code configured to, with the processing circuitry, enable the apparatus to: receive, from a network device, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format; determine at least one set of the at least two sets of transmission parameters, based on an associated cross-division duplexing slot format of the at least one set of the at least two sets of transmission parameters for communication with the network device; and perform the communication with the network device on at least one resource of the at least one of the configured grant configuration or the semi-persistent scheduling configuration using the at least one determined set of the at least two sets of transmission parameters.

In accordance with one example embodiment, an apparatus may comprise means for performing: receiving, from a network device, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format; determining at least one set of the at least two sets of transmission parameters, based on an associated cross-division duplexing slot format of the at least one set of the at least two sets of transmission parameters for communication with the network device; and performing the communication with the network device on at least one resource of the at least one of the configured grant configuration or the semi-persistent scheduling configuration using the at least one determined set of the at least two sets of transmission parameters.

The cross-division duplexing slot format may comprise at least one of: a cross-division duplexing time slot for communication in a plurality of directions, or a cross-division duplexing time slot for communication in one direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between the apparatus and at least one other user equipment.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink or the second direction of sidelink.

The received configuration message may be received via radio resource control signaling.

The received configuration message may comprise a downlink control information message.

The configuration message may comprise, at least, a radio resource control configuration message and a downlink control information message, wherein the downlink control information message may include a set of transmission parameters for the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration and the at least one determined set of transmission parameters.

The configuration message may be configured to indicate: a first cross-division duplexing slot format associated with a first set of transmission parameters of the at least two sets of transmission parameters, and a second cross-division duplexing slot format associated with a second set of transmission parameters of the at least two sets of transmission parameters.

The set of transmission parameters associated with the cross-division duplexing slot format may comprise at least one of: a frequency domain resource allocation, a modulation and coding scheme, a periodicity, at least one parameter relating to a transmission power setting, a number of repetitions, or a time domain resource allocation.

The means configured to perform communication with the network device may comprise means configured to perform at least one of: receiving, from the network device, at least one transmission on the at least one resource using the at least one determined set of the at least two sets of transmission parameters; or transmitting, to the network device, at least one transmission on the at least one resource using the at least one determined set of the at least two sets of transmission parameters.

In accordance with one example embodiment, a non-transitory computer-readable medium comprising program instructions stored thereon which, when executed with at least one processor, cause the at least one processor to: receive, from a network device, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format; determine at least one set of the at least two sets of transmission parameters, based on an associated cross-division duplexing slot format of the at least one set of the at least two sets of transmission parameters for communication with the network device; and perform the communication with the network device on at least one resource of the at least one of the configured grant configuration or the semi-persistent scheduling configuration using the at least one determined set of the at least two sets of transmission parameters.

The cross-division duplexing slot format may comprise at least one of: a cross-division duplexing time slot for communication in a plurality of directions, or a cross-division duplexing time slot for communication in one direction.

The plurality of communication directions may comprise communication in at least one of: uplink, downlink, a first direction of sidelink, or a second direction of sidelink.

The one communication direction may comprise communication in at least one of: uplink only, downlink only, a first direction of sidelink only, or a second direction of sidelink only.

The communication in the first direction of sidelink or the communication in the second direction of sidelink may comprise communication between a user equipment and the network device.

The cross-division duplexing slot format may comprise at least one of: an uplink only cross-division duplexing slot format, a downlink only cross-division duplexing slot format, a first direction of sidelink only cross-division duplexing slot format, a second direction of sidelink only cross-division duplexing slot format, or a mixed cross-division duplexing slot format configured to enable at least two of: uplink, downlink, the first direction of sidelink or the second direction of sidelink.

The received configuration message may be received via radio resource control signaling.

The received configuration message may comprise a downlink control information message.

The configuration message may comprise, at least, a radio resource control configuration message and a downlink control information message, wherein the downlink control information message may include a set of transmission parameters for the at least one of the configured grant configuration or the semi-persistent scheduling configuration, wherein a timing of reception of one of: the downlink control information message, or a data transmission scheduled with the downlink control information message may be configured to indicate the cross-division duplexing slot format associated with the at least one of the configured grant configuration or the semi-persistent scheduling configuration and the at least one determined set of transmission parameters.

The configuration message may be configured to indicate: a first cross-division duplexing slot format associated with a first set of transmission parameters of the at least two sets of transmission parameters, and a second cross-division duplexing slot format associated with a second set of transmission parameters of the at least two sets of transmission parameters.

The set of transmission parameters associated with the cross-division duplexing slot format may comprise at least one of: a frequency domain resource allocation, a modulation and coding scheme, a periodicity, at least one parameter relating to a transmission power setting, a number of repetitions, or a time domain resource allocation.

The example non-transitory computer-readable medium may be further configured to: at least one of: receive, from the network device, at least one transmission on the at least one resource using the at least one determined set of the at least two sets of transmission parameters; or transmit, to the network device, at least one transmission on the at least one resource using the at least one determined set of the at least two sets of transmission parameters.

In accordance with another example embodiment, a non-transitory program storage device readable by a machine may be provided, tangibly embodying a program of instructions executable by the machine for performing operations, the operations comprising: receive, from a network device, a configuration message comprising at least two sets of transmission parameters associated with at least one of: a configured grant configuration, or a semi-persistent scheduling configuration, wherein a set of transmission parameters of the at least two sets of transmission parameters may be associated with a cross-division duplexing slot format; determine at least one set of the at least two sets of transmission parameters, based on an associated cross-division duplexing slot format of the at least one set of the at least two sets of transmission parameters for communication with the network device; and perform the communication with the network device on at least one resource of the at least one of the configured grant configuration or the semi-persistent scheduling configuration using the at least one determined set of the at least two sets of transmission parameters.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor; and
   at least one non-transitory memory including computer program code;
   the at least one memory and the computer program code configured to, with the at least one processor, cause the apparatus at least to:
   transmit, to a user equipment, a configuration message comprising at least one of:
     a configured grant configuration, or
     a semi-persistent scheduling configuration,
   wherein the at least one of the configured grant configuration or the semi-persistent scheduling configuration is associated with a cross-division duplexing slot format,
   wherein the configuration message further comprises an information of at least one resource, and the at least one resource is to be determined whether or not to be used for communication based on a result of comparing a corresponding cross-division duplexing slot format of the at least one resource to the cross-division duplexing slot format associated with the at least one of the configured grant configuration or the semi-persistent scheduling configuration; and perform the communication with the user equipment on the at least one resource.

2. An apparatus comprising:
at least one processor; and
at least one non-transitory memory including computer program code;
the at least one memory and the computer program code configured to, with the at least one processor, cause the apparatus at least to:
  receive, from a network device, a configuration message comprising at least one of:
    a configured grant configuration, or
    a semi-persistent scheduling configuration,
  wherein the at least one of the configured grant configuration or the semi-persistent scheduling configuration is associated with a cross-division duplexing slot format,
  wherein the configuration comprises an information of at least one resource of at least one of the configured grant configuration or the semi-persistent scheduling configuration;
  determine whether the at least one resource is to be used for communication with the network device, based on a result of comparing a corresponding cross-division duplexing slot format of the at least one resource to the cross-division duplexing slot format associated with the at least one of the configured grant configuration or the semi-persistent scheduling configuration in the configuration message; and
  perform the communication with the network device on the at least one resource.

3. The apparatus of claim 2, wherein the cross-division duplexing slot format of the at least one resource comprises at least one of:
  a cross-division duplexing time slot for communication in a plurality of communication directions, or
  a cross-division duplexing time slot for communication in one communication direction.

4. The apparatus of claim 3, wherein the plurality of communication directions comprises communication in at least one of: uplink, downlink, a first direction of sidelink, or a second direction of sidelink.

5. The apparatus of claim 4, wherein the communication in the first direction of sidelink or the communication in the second direction of sidelink comprises communication between the apparatus and at least one other user equipment.

6. The apparatus of claim 3, wherein the one communication direction comprises communication in at least one of: uplink only, downlink only, a first direction of sidelink only, or a second direction of sidelink only.

7. The apparatus of claim 2, wherein the cross-division duplexing slot format of the at least one resource comprises at least one of:
  an uplink only cross-division duplexing slot format,
  a downlink only cross-division duplexing slot format,
  a first direction of sidelink only cross-division duplexing slot format,
  a second direction of sidelink only cross-division duplexing slot format, or
  a mixed cross-division duplexing slot format configured to enable at least two of: uplink, downlink, the first direction of sidelink, or the second direction of sidelink.

8. The apparatus of claim 2, wherein the received configuration message is received via radio resource control signaling.

9. The apparatus of claim 2, wherein the received configuration message comprises a downlink control information message.

10. The apparatus of claim 2, wherein the configuration message comprises, at least, a radio resource control configuration message and a downlink control information message configured to activate the at least one of the configured grant configuration or the semi-persistent scheduling configuration, wherein a timing of reception of one of:
  the downlink control information message, or
  a data transmission scheduled with the downlink control information message
is configured to indicate the cross-division duplexing slot format associated with the at least one of the configured grant configuration or the semi-persistent scheduling configuration.

11. The apparatus of claim 2, wherein the configuration message is configured to indicate:
  a first cross-division duplexing slot format associated with a first configuration of the at least one of the configured grant configuration or the semi-persistent scheduling configuration, and
  a second cross-division duplexing slot format associated with a second configuration of the at least one of the configured grant configuration or the semi-persistent scheduling configuration.

12. The apparatus of claim 2, wherein performing communication with the network device comprises the at least one memory and the computer program code are configured to, with the at least one processor, cause the apparatus at least to at least one of:
  receive, from the network device, at least one transmission on the at least one resource; or
  transmit, to the network device, at least one transmission on the at least one resource.

13. An apparatus comprising:
at least one processor; and
at least one non-transitory memory including computer program code;
the at least one memory and the computer program code configured to, with the at least one processor, cause the apparatus at least to:
  receive, from a network device, a configuration message comprising at least two sets of transmission parameters associated with at least one of:
    a configured grant configuration, or
    a semi-persistent scheduling configuration,
  wherein a set of transmission parameters of the at least two sets of transmission parameters is associated with a cross-division duplexing slot format;
  determine at least one set of the at least two sets of transmission parameters, based on an associated cross-division duplexing slot format of the at least one set of the at least two sets of transmission parameters for communication with the network device; and
  perform the communication with the network device on at least one resource of the at least one of the configured grant configuration or the semi-persistent scheduling configuration using the at least one determined set of the at least two sets of transmission parameters.

14. The apparatus of claim 13, wherein the cross-division duplexing slot format comprises at least one of:
  a cross-division duplexing time slot for communication in a plurality of communication directions, or a cross-division duplexing time slot for communication in one communication direction.

15. The apparatus of claim 14, wherein the plurality of communication directions comprises communication in at least one of: uplink, downlink, a first direction of sidelink, or a second direction of sidelink.

16. The apparatus of claim 14, wherein the one communication direction comprises communication in at least one of: uplink only, downlink only, a first direction of sidelink only, or a second direction of sidelink only.

17. The apparatus of claim 13, wherein the cross-division duplexing slot format comprises at least one of:
- an uplink only cross-division duplexing slot format,
- a downlink only cross-division duplexing slot format,
- a first direction of sidelink only cross-division duplexing slot format,
- a second direction of sidelink only cross-division duplexing slot format, or
- a mixed cross-division duplexing slot format configured to enable at least two of: uplink, downlink, the first direction of sidelink, or the second direction of sidelink.

18. The apparatus of claim 13, wherein the configuration message comprises, at least, a radio resource control configuration message and a downlink control information message, wherein the downlink control information message includes a set of transmission parameters for the at least one of the configured grant configuration or the semi-persistent scheduling configuration, wherein a timing of reception of one of:
- the downlink control information message, or
- a data transmission scheduled with the downlink control information message is configured to indicate the cross-division duplexing slot format associated with the at least one of the configured grant configuration or the semi-persistent scheduling configuration and the at least one determined set of transmission parameters.

19. The apparatus of claim 13, wherein the configuration message is configured to indicate:
- a first cross-division duplexing slot format associated with a first set of transmission parameters of the at least two sets of transmission parameters, and
- a second cross-division duplexing slot format associated with a second set of transmission parameters of the at least two sets of transmission parameters.

20. The apparatus of claim 13, wherein the set of transmission parameters associated with the cross-division duplexing slot format comprises at least one of:
- a frequency domain resource allocation,
- a modulation and coding scheme,
- a periodicity,
- at least one parameter relating to a transmission power setting,
- a number of repetitions, or
- a time domain resource allocation.

* * * * *